(12) United States Patent
Smith et al.

(10) Patent No.: US 6,301,382 B1
(45) Date of Patent: Oct. 9, 2001

(54) EXTRACTING A MATTE OF A FOREGROUND OBJECT FROM MULTIPLE BACKGROUNDS BY TRIANGULATION

(75) Inventors: Alvy Ray Smith, Seattle; James F. Blinn, Bellevue, both of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 08/870,940

(22) Filed: Jun. 6, 1997

Related U.S. Application Data

(60) Provisional application No. 60/019,271, filed on Jun. 7, 1996.

(51) Int. Cl.[7] ................................................ G06K 9/00
(52) U.S. Cl. .......................... 382/162; 382/163; 382/284; 348/586; 345/114
(58) Field of Search ................................... 382/162, 163, 382/167, 154, 284; 348/586–587, 592, 578, 584, 590, 577; 345/435, 114; 358/540, 450

(56) References Cited

U.S. PATENT DOCUMENTS

| 4,100,569 | * | 7/1978 | Vlahos ................................. 348/587 |
| 4,835,532 | * | 5/1989 | Fant ..................................... 345/136 |
| 5,140,416 | * | 8/1992 | Tinkler ................................. 348/33 |
| 5,194,941 | * | 3/1993 | Grimaldi et al. .................... 348/587 |
| 5,249,039 | * | 9/1993 | Chaplin ............................... 348/587 |
| 5,343,252 | * | 8/1994 | Dadourian .......................... 348/586 |
| 5,355,174 | * | 10/1994 | Mishima ............................. 348/592 |
| 5,428,401 | * | 6/1995 | Hinson ................................ 348/586 |
| 5,764,306 | * | 6/1998 | Steffano ............................. 348/586 |
| 5,914,748 | * | 6/1999 | Parulski et al. .................... 348/239 |
| 6,020,885 | * | 2/2000 | Honda . |
| 6,028,583 | * | 2/2000 | Hamburg ............................ 345/112 |
| 6,134,346 | * | 10/2000 | Berman et al. ..................... 382/163 |

OTHER PUBLICATIONS

Smith, Alvy Ray, "Alpha and the History of Digital Compositing," Technical Memo 7, Aug. 15, 1995, Microsoft Tech Memo 7, 10pp.

Smith, Alvy Ray, "Image Compositing Fundamentals," Technical Memo 4, Aug. 15, 1995, Microsoft Tech Memo 4, 10pp.

Smith, Alvy Ray, "Analysis of the Color–Difference Technique," Technical Memo No. 30, Lucafilm Ltd., Mar. 29, 1982, 6pp.

Smith, Alvy Ray, "Math of Mattings," Technical Memo No. 32, Lucasfilm Ltd., Apr. 2, 1982 (Reissue of memo of 30 Declaration 1980), 9pp.

Mishima, Yasushi, Japanese language article "A Software Chromakeyer Using Polyhedric Slice," Imagica Corp., R&D Division, Nicograph 1992, 9pp.

* cited by examiner

*Primary Examiner*—Leo Boudreau
*Assistant Examiner*—Ishrat Sherali
(74) *Attorney, Agent, or Firm*—Ronald M. Anderson

(57) ABSTRACT

A method for pulling (extracting) a matte of an image of a foreground object from a composite image, using a computer. An image of the foreground object is recorded over at least two backgrounds having arbitrarily different coloring. Each point of one background must have a color that is different than the color of a corresponding point in the other backgrounds. The images may be recorded with an analog camera and digitized with a scanner or recorded with a digital camera. Images should be registered during recording and digitization to eliminate misalignment of corresponding points in each recorded image. A triangulation of corresponding points of each recorded image is performed so that an alpha value (opacity) and a set of color coordinates for each point of an uncomposited image of the foreground object may be determined using either a difference of sums technique or a least squares technique. To facilitate the triangulation, images are recorded of each background alone, without the foreground object. The lighting and distances between the camera and object, and between the object and backgrounds should remain constant during the image recording process.

53 Claims, 15 Drawing Sheets

(8 of 15 Drawing Sheet(s) Filed in Color)

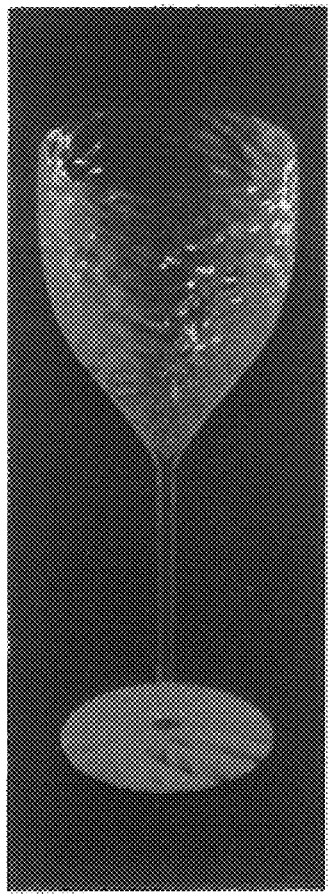 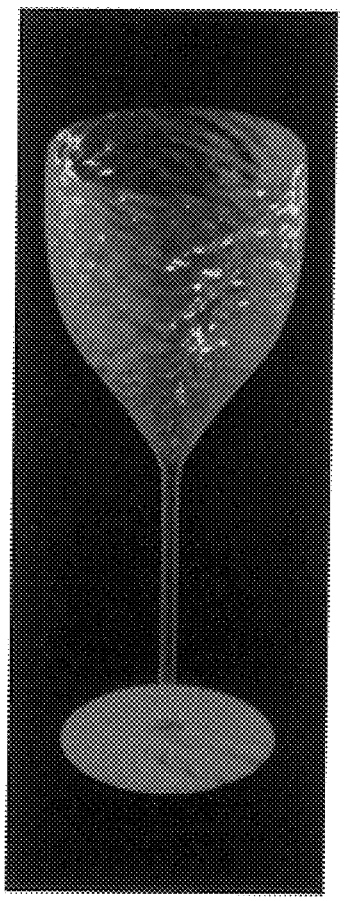
*FIG. 7A*  *FIG. 7B*

US 6,301,382 B1

EXTRACTING A MATTE OF A FOREGROUND OBJECT FROM MULTIPLE BACKGROUNDS BY TRIANGULATION

RELATED APPLICATION

This application is a continuation-in-part patent application, based on prior copending provisional application Ser. No. 60/019,271, filed Jun. 7, 1996, the benefit of the filing date of which is hereby claimed under 35 U.S.C. §119(e).

FIELD OF THE INVENTION

The present invention relates to a method for "pulling" or extracting an image of one or more foreground objects from a composite image in which the foreground objects are in front of a background, and more particularly, to a method for pulling the one or more foreground objects from recorded images of the one or more objects disposed in front of two differently colored backgrounds.

BACKGROUND OF THE INVENTION

In the motion picture industry, pulling a matte of a foreground object from a scene, i.e., extracting an image of the object from a background, and combining (compositing) the pulled matte with another entirely different background has proven to be difficult. Historically, an image of a foreground object was pulled with a matte created from a strip of monochrome film that was transparent for those portions of a scene that contained the desired object and opaque everywhere else. In this way, when the matte was placed together with another strip of film that included the complete scene (foreground object and background), only the foreground object would be illuminated (visible on a projection screen). A holdout matte is the complement of a matte because it is opaque for those portions of a scene that contain the foreground object(s) and transparent everywhere else. Thus, the holdout matte may be employed to pull a matte of the image of the background so that another foreground object may be combined with the pulled matte to create a new composite image. Furthermore, a matte and a holdout matte may have regions that are partially transparent, so that the foreground object and/or the background may be partially illuminated.

New scenes are often created by compositing an extracted (uncomposited) foreground object with a separately recorded background. A significant benefit of compositing is that if the foreground object needs alteration, the entire scene does not have to be re-recorded with the background. Instead, the individual foreground object may be manipulated and separately re-recorded. Also, if an object is not recorded with a camera, but has been optically scanned into a video memory, compositing may be the only way to incorporate the object into a composite image of a desired scene.

In the prior art, several techniques have been employed to extract an image of a foreground object from a background with varying degrees of success. One technique employs special types of light sources, such as sodium, infrared, and ultraviolet, to simultaneously record multiple images of a foreground object disposed over a single background on multiple strips of film. The multiple film images provide information about particular attributes of the foreground object so that the object's matte may be more easily pulled. However, employing special light sources to simultaneously record multiple images of a foreground object on different strips of film with multiple cameras or with a single camera that is modified to record on multiple strips of film simultaneously is difficult and expensive.

Another prior art technique teaches recording one image of a foreground object onto a single strip of film. The technique employs a uniform backing color behind a foreground object to pull a matte of the object. Petros Vlahos, an early pioneer of the motion picture and video industries, invented the Color Difference Technique™, which is the most commonly employed single film image technique for pulling a matte of a foreground object. Vlahos developed this technique so that editors in the film industry could inexpensively produce an image of separately recorded foreground objects combined with a new background. The technique provides for recording an image of a foreground object(s) in front of a background that has a pure and uniform color, such as blue, green, or yellow. Since blue is the most frequently employed pure and uniform color for backgrounds, the Color Difference Technique™ is commonly referred to as "blue screen matting." Next, an operator manipulates a set of controls to pull a matte of those portions (foreground objects) of the image that do not contain the pure and uniform color. The pulled matte is the image of the foreground object and the matte may be combined with another separately recorded background to create a new composite image. Thus, the Color Difference Technique™ enables the separate recording of a foreground object within a film studio, so that a pulled matte of the object may be added to a new background at a later date. This aspect of the Color Difference Technique™ can be particularly important when creating a composite image that has a background, which is inherently expensive or dangerous to produce.

One disadvantage of the Color Difference Technique™ is that a background having a pure and uniform color is expensive to manufacture, and the impurities in the color of the background will adversely effect the quality of the matte pulled of the foreground object. Another disadvantage is that the coloring of the foreground object is restricted to those colors not represented in the background. Since the Color Difference Technique™ can only pull a matte of those portions of a foreground object that do not have the same color as the background, the matte will have a "hole" in any portion of the object that includes the background's color. For example, if a user of the Color Difference Technique™ employs a blue background to pull a matte of an actor having blue eyes of the same blue color as the background, the eyes of the actor will appear as transparent holes in the matte. Thus, the Color Difference Technique™ is an imperfect solution to the problem of pulling a matte of a foreground object.

Vlahos also developed an apparatus, the Ultimatte™, that applied the concepts of the Color Difference Technique™ to the production of video images. In addition to determining the color coordinates for each point (pixel) of an uncomposited foreground object, the Ultimatte™ provides for calculating an alpha channel of the object so that a digital matte may be accurately pulled of the object for video. The alpha channel is the digital equivalent of the holdout matte that is used to remove a foreground object from a scene in the film industry. However, the alpha channel is used in video to provide shape and transparency to a foreground object. A zero value in the alpha channel value for a pixel causes the pixel to be transparent, and as the alpha value approaches 100%, the pixel becomes increasingly more opaque, at the color specified for the pixel.

SUMMARY OF THE INVENTION

In accord with the present invention, a method is defined for extracting an image of a foreground object from composite digitized images, using a computer. The method includes the steps of recording a first composite image in which the foreground object is disposed in front of a first background having a first arbitrary coloring. A second composite image is then recorded that includes the foreground object disposed in front of a second background having a second arbitrary coloring that is different than the first arbitrary coloring. A set of color coordinates are obtained for each point in the first composite image and in the second composite image; the color coordinates define a color for each point. Finally, the set of color coordinates for each point in each of the first and the second composite images is triangulated, returning an alpha value and a set of color coordinates for each point in the image of the foreground object, to define the image of the foreground object apart from any background.

One of the features of the present invention is that the image of the foreground object may include a shadow of the foreground object that is cast on the first and the second backgrounds.

BRIEF DESCRIPTION OF THE DRAWING FIGURES

The file of this patent contains at least one drawing executed in color. Copies of this patent with color drawing(s) will be provided by the Patent and Trademark Office upon request and payment of the necessary fee.

The foregoing aspects and many of the attendant advantages of this invention will become more readily appreciated as the same becomes better understood by reference to the following. detailed description, when taken in conjunction with the accompanying drawings, wherein:

FIG. 7A is a color picture of a foreground object (goblet) disposed over a background of pure blue color;

FIG. 7B is a color picture of the goblet disposed over a background of pure black color;

DESCRIPTION OF THE PREFERRED EMBODIMENT

Figure 1:
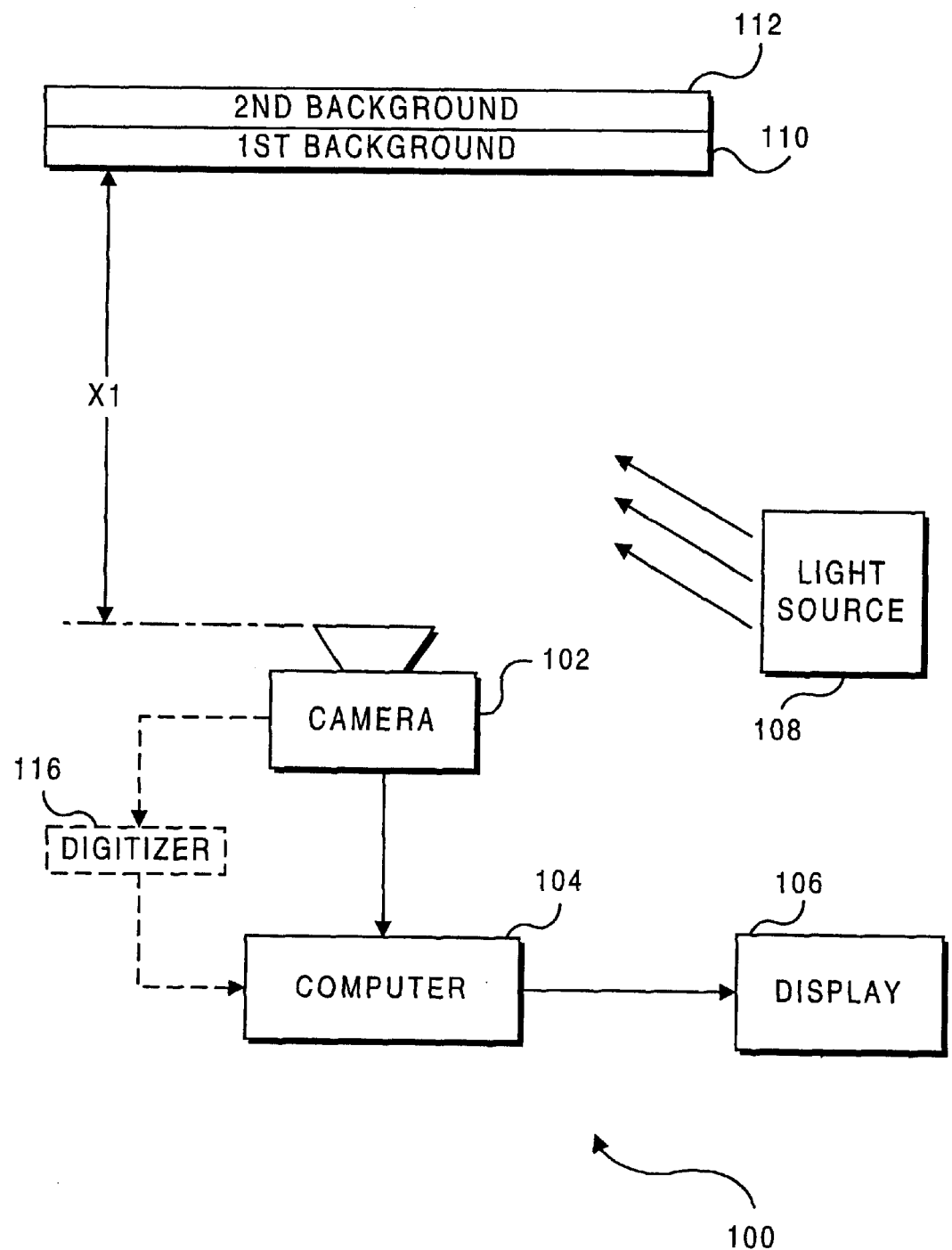
FIG. 1 is a schematic block diagram showing the relative disposition of a camera and a background for implementing the first step of the preferred embodiment.

The present invention uses triangulation to determine an alpha ($\alpha$) channel of a foreground object thereby pulling a matte of the object from a composited image of the object and a background. The preferred embodiment triangulates the images of at least four pictures to determine the $\alpha$ channel, the four pictures being: (1) a picture of a first background; (2) a picture of the foreground object in front of the first background; (3) a picture of a second background; and (4) a picture of the foreground object in front of the second background. Although the preferred embodiment employs only two pairs of images (four pictures) for triangulation, additional pairs of images may optionally be employed in determining the value of the $\alpha$ channel for the foreground object. Significantly, the accuracy of this value for the $\alpha$ channel increases as the number of pairs of images that are triangulated increases.

Triangulating a foreground object in front of multiple backgrounds is not easily accomplished with live actors or other moving foreground objects, because the distance and direction of the lighting must be substantially identical for each recorded image. Also, the exposure setting for the camera (analog or digital) must be constant for each recorded image. Another important limitation is that the color of pixels of one background must be different from the color of corresponding pixels in the other background(s). However, since the colors of the multiple backgrounds may be any arbitrary color, color impurities in the background will not affect the accuracy of the triangulation process. For example, a first background could be a collage of color swatches and the second background might be a brightly colored landscape, so long as each corresponding pixel has a different arbitrary color. In contrast, the prior art solutions require one specially prepared background that has the same pure or substantially uniform color for each pixel, such as a solid blue color.

Furthermore, the constant lighting may create a shadow of the foreground object on the background during the recording of a composited image. The preferred embodiment of the present invention includes the shadow of the foreground object as part of the matte that is pulled from the composited image. Thus, the foreground object and its shadow may be disposed over the background of the final composite image.

Mathematical Model

As noted above, the present invention allows a matte of a foreground object to be pulled from two or more single film composite images of the object. Unlike a multiple film composite image, a single film composite image does not contain explicit information about the foreground object or the background. A mathematical model is employed that enables the determination of explicit information for each image element that will define an uncomposited image of a foreground object. Note that in the following discussion, the "color of an image" generally refers to the color of each element (pixel or point) in the image, each of which may be different.

The color of each point in an image is represented by the three primary color coordinates (R, G, B) and an $\alpha$ channel. The color coordinates are assumed to have been premultiplied by the $\alpha$ channel. An important feature of a pre-multiplied $\alpha$ formulation is that the math applied to the three primary color coordinates red, green, and blue (R, G, B) is the same as that applied to the $\alpha$ coordinate. For any image element the notation $C_i=[R_i\ G_i\ B_i\ \alpha_i]$ is used and each of the four coordinates is assumed to be bounded from 0 to 1. If only the color components are required, the notation $c_i=[R_i\ G_i\ B_i]$ is used.

The first modeled image required by this technique is a composited foreground image (i.e., a foreground object against a background) that has a color $C_f$. The second modeled image required is of the background, which has a color $C_k$. Furthermore, the foreground image color $C_f$ is a composite of the background color $C_k$, and a color $C_o$ of an uncomposited foreground object. Since $C_o$ is an uncomposited foreground color, this foreground object, in isolation from any background, is at least partially transparent whenever the background color $C_k$ shows through. The equation $C_f=C_o+(1-\alpha_o)C_k$ (using standard vector algebra) expresses the point-by-point foreground image color as a composite of $C_k$ and $C_o$. The present invention assumes $\alpha_f=\alpha_k=1$ for $C_f$ and $C_k$, i.e., the given foreground image and background image are opaque and rectangular. The notation described above facilitates defining the matting problem solved by the present invention as explained below.

The Matting Problem

Given $C_f$ and $C_k$ at corresponding points in two or more composite images, and assuming that $C_f=C_o+(1-\alpha_o)C_k$, determine $C_o$.

The equation for $C_f$ above, is referred to as the Matting Equation and the uncomposited foreground object color $C_o$, which is pre-multiplied by the $\alpha_o$ channel, is a solution to the Matting Problem.

Uncomposited foreground objects (those with elements or points for which $\alpha_o>0$ and having the color $C_o$) are commonly known as sprites in the video industry. Once a solution $C_o$ (including the $\alpha_o$ channel) is found for each pixel (image element) of the sprite, that sprite can be composited over a new background $C_b$ with the expression $C=C_o+(1-\alpha_o)C_b$. Thus, solving the Matting Equation enables the determination of the color C so that a new composite image of the foreground object disposed over the new background may be produced.

In contrast to the present invention, the prior art only employs one foreground image color, $C_f$, to calculate the $\alpha_o$ channel of an uncomposited foreground object. Pulling a matte of a foreground object from a single film image, as typically practiced in a film or video effects house, is intrinsically difficult. In fact, there is an infinity of solutions, which implies that there is no algorithmic method for pulling a matte from a given foreground object. Instead, the prior art employs a human operator and/or image processing software that "knows" a correct matte. The operator is provided with a set of controls usable to "home in" on a matte of the foreground object. Thus, the success of a matting machine in the prior art is determined by the cleverness of its designers in selecting and providing a set of controls that enable the operator to home in on the matte of the foreground object.

A mathematical proof of the infinity of solutions for pulling a matte from a single film image is as follows. For the red component, $R_f$ is an interpolation from $R_k$ to $R_o$ with a weight $\alpha_o$, i.e., $R_f=R_o+(1-\alpha_o)R_k$; similar relations hold for the green and blue components $G_f$ and $B_f$. A complete solution requires $R_o$, $G_o$, $B_o$, and $\alpha_o$. There are three equations and four unknowns, which is an incompletely specified problem, and hence, an infinity of solutions exist. This problem is unsolvable without more information. However, there are three solutions for special cases where an answer to the Matting Problem does exist.

Solution 1: No Blue

In the prior art, the Matting Problem may be solved when the background is a substantially pure color, such as red, green, or blue, and the foreground object does not include the color of the background.

If $c_o$ is known to contain no blue, $c_o=[R_o\ G_o\ 0]$, and $c_k$ contains only blue, $c_k=[0\ 0\ B_k]$, then $$c_f=c_o+(1-\alpha_o)c_k=[R_o G_o (1-\alpha_o)B_k].$$

Thus, solving the $B_f=(1-\alpha_o)B_k$ equation for $\alpha_o$ gives solution $$C_o = \left[\ R_f\ \ G_f\ \ 0\ \ 1-\frac{B_f}{B_k}\ \right], \text{if } B_k \neq 0.$$

This example is exceedingly ideal. The restriction to foreground objects with no blue is quite serious, excluding all grays but black, about two-thirds of all hues, and all pastels or tints of the remaining hues (because white contains blue). Basically, it is only valid for one plane of a three dimensional (3D) RGB colorspace, the RG plane.

The assumption of a perfectly flat and perfectly blue background color is not realistic. Even very carefully prepared "blue screens" used in cinema special effects as backgrounds have slight spatial brightness variations and also have some red and green impurities (background impurities). A practical solution for brightness variations, in the case of repeatable shots, is to film a pass without the foreground object to produce a record of $B_k$ at each point to be used for computing $C_o$, after a second pass with the object. Historically, pure blue was arbitrarily chosen as the background color and represents an idealization of customary film and video practice.

Solution 2: Gray or Flesh

In the prior art, the matting problem may be solved if the foreground object $c_o$ is known to be gray colored or either $R_o$ or $G_o$ equals $B_o$. In fact, there is a solution to the matting problem if $R_o$ or $G_o=aB_o+b\alpha_o$, and if the color of the background $c_k$ is pure blue with $aB_k+b\neq 0$. Only the solution $C_o$ is derived below, for the green case, since the solution for red can be derived in a similar fashion:

The conditions, rewritten in color primary coordinates, are:

$$c_f=[R_o aB_o+b\alpha_o B_o+(1-\alpha_o)B_k].$$

Eliminate $B_o$ from the expressions for $G_f$ and $B_f$ to solve for $\alpha_o$:

$$C_o = \left[ \begin{array}{cccc} R_f & G_f & B_\Delta + \alpha_o B_k & \dfrac{G_f - aB_\Delta}{aB_k + b} \end{array} \right], \text{ if } aB_k + b \neq 0.$$

A very useful equation is: $C_\Delta = C_f - C_k$.

The special case of $C_o$ being gray colored clearly satisfies Solution 2, with a=1 and b=0 for both $R_o$ and $G_o$. Thus, it is not surprising that science fiction space movies effectively use the blue screen process because many of the foreground objects are neutrally colored spacecraft. This technique works adequately with desaturated foreground objects having a color tending towards gray, typical of many real-world objects.

A particularly important foreground element in film and video is flesh, which typically has color [d 0.5d 0.5d]. The flesh tones of all races tend to have the same ratio of primaries, so that the value of d is the darkening or lightening factor. This is a non-gray example satisfying Solution 2, so it is not surprising that the blue screen process also works for the special case in which $C_o$ is flesh colored.

Solution 3: Triangulation

The third solution of triangulation is implemented by the present invention and is not employed by any of the prior art techniques. Suppose $c_o$ is known against two different shades of background color. Then, a complete solution exists, as noted below, which does not require any special information about $c_0$.

Let $B_{k_1}$ and $B_{k_2}$ be two shades of a blue background color, i.e., $B_{k_1} = cB_k$ and $B_{k_2} = dB_k$ for $0 \leq d \leq c \leq 1$. Assume $c_0$ is known against these two shades. Also, $c_{k_2}$ can be black, i.e., d=0. Then, there exists a solution $C_o$ to the Matting Problem, as shown below.

The assumption that $c_o$ is known against two shade of $B_k$ is equivalent to the following:

$c_{f_1} = [R_o G_o B_o + (1-\alpha_o) B_{k_1}]$ $c_{f_2} = [R_o G_o B_o + (1-\alpha_o) B_{k_2}]$.

The expressions for $B_{f_1}$ and $B_{f_2}$ can be combined and $B_o$ eliminated to show $$\alpha_o = 1 - \frac{B_{f_1} - B_{f_2}}{B_{k_1} - B_{k_2}},$$

where the denominator is not 0 since the two background shades are different. Then $$R_o = R_{f_1} = R_{f_2} \qquad G_o = G_{f_1} = G_{f_2} \qquad B_o = \frac{B_{f_2} B_{k_2} - B_{f_1} B_{k_2}}{B_{k_1} - B_{k_2}}$$

completes the solution. In the case of $C_{k_2}$ being black, $C_o = C_{f_2}$ for $C_o = C_{f_2} - (1 - \alpha_o) C_{k_2}$ because $C_{k_2} = 0$.

No commonly used matting technique asks that the foreground object be filmed or imaged against two arbitrarily different backgrounds. For computer controlled shots, it is a possibility, but not usually done. If passes of a computer controlled camera are employed to solve the problem of a non-uniformly colored background mentioned earlier, then the triangulation solution will require four passes. FIGS. 7A–7D illustrate the four passes that must be recorded to eliminate the non-uniformly colored background problem when employing the triangulation solution.

The shadow of a foreground object is a part of that object to the extent that it is disposed over the background. Also, it is extremely difficult to perform darkening of a background that emits light, without changing the shadow of the foreground object. A solution to the background shadow problem for the special case where the triangulation solution applies requires a more precise method, which is presented below.

Generalizations of Solution 3 (Triangulation)

The preceding solutions are all special cases of the generalization obtained by putting the Matting Equation into a matrix form:

$$C_o \begin{bmatrix} 1 & 0 & 0 & t_1 \\ 0 & 1 & 0 & t_2 \\ 0 & 0 & 1 & t_3 \\ -R_k & -G_k & -B_k & t_4 \end{bmatrix} = [R_\Delta \ G_\Delta \ B_\Delta \ T],$$

where a fourth column has been added in two places to convert an underspecified problem into a completely specified problem. Let $\bar{t} = [t_1 t_2 t_3 t_4]$.

The matrix equation has a solution $C_o$ if the determinant of the 4×4 matrix is non-zero, or $t_1 R_k + t_2 G_k + t_3 B_k + t_4 = \bar{t} \cdot C_k \neq 0$.

Since $\alpha_\Delta = 0$ always, standard linear algebra gives the following solution:

$$\alpha_o = \frac{T - (t_1 R_\Delta + t_2 G_\Delta + t_3 B_\Delta)}{\bar{t} \cdot C_k}$$

$$= \frac{T - \bar{t} \cdot C_\Delta}{\bar{t} \cdot C_k}$$

$$= 1 - \frac{\bar{t} \cdot C_f - T}{\bar{t} \cdot C_k}.$$

Then $c_o = c_\Delta + \alpha_o c_k$, from the Matting Equation.

Solutions 1 and 2 are obtained by using the following two options, respectively, for $\bar{t}$ and T, where the condition on $\bar{t} \cdot C_k$ is given in parentheses:

$\bar{t} = [0010]$; $T = 0$; $(B_k \neq 0)$ $\bar{t} = [0 - 1 ab]$; $T = 0$; $(-G_k + aB_k + b \neq 0)$.

The latter condition reduces to that derived for Solution 2 by the choice of a pure blue background color, i.e., $G_k = 0$. The general result is a theorem for which these solutions are corollaries, specifically:

Theorem 1. There is a solution $C_o$ to the Matting Problem if there is a linear condition $\bar{t} \cdot C_o = 0$ on the color of the uncomposited foreground object, with $\bar{t} \cdot C_k \neq 0$.

Proof. T=0 in the matrix equation above gives $$\alpha_o = 1 - \frac{\bar{t} \cdot C_f}{\bar{t} \cdot C_k}.$$

Geometrically, Theorem 1 means that all solutions $C_o$ lie on a plane, and that $C_k$ does not lie on that plane.

Solution 3 above can also be seen to be a special case of the general matrix formulation with these choices and condition, where by extended definition, $C_{\Delta_i} = C_{f_i} - C_{k_i}$, i=1 or 2:

$\bar{t} = [0 0 1 - B_{k_2}]$; $T = B_{\Delta_2}$; $(B_{k_1} - B_{k_2} \neq 0)$, with $C_k = [0\ 0\ B_{k_1}\ 1]$ and on the right side, the matrix is: $[R_{f_1}\ G_{f_1}\ B_{\Delta_1}\ B_{\Delta_2}]$ This solution too is a corollary of a more general one in which $C_{k_1}$ is not restricted to a shade of blue.

Theorem 2. There is a solution $C_o$ to the Matting Problem if the uncomposited foreground object is known against two distinct background colors $C_{k_1}$ and $Ck_{k_2}$, where $C_{k_1}$ is arbitrary, $C_{k_2}$ is a shade of pure blue, and $B_{k_1} - B_{k_2} \ne 0$.

Proof. This is just the matrix equation above, with $\bar{t}$ and $\overline{T}$ defined as for Solution 3, but with $C_k$ generalized to $[R_{k_1}\ G_{k_1}\ B_{k_1}\ 1]$ and with the right side of the matrix equation being: $[R_{\Delta_1}\ G_{\Delta_1}\ B_{\Delta_1}\ B_{\Delta_2}]$. Thus, as was true for Solution 3, $$\alpha_o = \frac{B_{\Delta_2} - B_{\Delta_1}}{B_{k_1} - B_{k_2}} = 1 - \frac{B_{f_1} - B_{f_2}}{B_{k_1} - B_{k_2}}.$$

The following generalization of Theorem 2 (i.e., Theorem 3) uses all of the $C_{k_2}$ background color information.

Theorem 3 (Difference of Sums). Let the sum of the color coordinates of any color $C_a$ be $\Sigma_a = R_a + G_a + B_a$. There is a solution $C_o$ to the Matting Problem if the uncomposited foreground object is known against two distinct background colors $C_{k_1}$ and $C_{k_2}$, where both are arbitrary and $$\Sigma_{k_1} - \Sigma_{k_2} = (R_{k_1} - R_{k_2}) + (G_{k_1} - G_{k_2}) + (B_{k_1} - B_{k_2}) \ne 0$$

Proof. Change $\bar{t}$ and $\overline{T}$ in the proof of Theorem 2 to $\bar{t} = [1\ 1\ 1\ -\Sigma_{k_2}]$; $T = \Sigma_{\Delta_2}$.

This gives $\bar{t} \cdot C_o = \Sigma_o - \alpha_o \Sigma_{k_2} = \Sigma_{f_2} - \Sigma_{k_2}$, which is obtained by adding the three primary color equations in the Matting Equation, $C_o - \alpha_o C_{k_2} = C_{\Delta_2}$. The solution is:

$$\alpha_o = \frac{\Sigma_{\Delta_1} - \Sigma_{\Delta_2}}{\Sigma_{k_1} - \Sigma_{k_2}}$$

$$= 1 - \frac{\Sigma_{f_1} - \Sigma_{f_2}}{\Sigma_{k_1} - \Sigma_{k_2}}$$

$$= 1 - \frac{(R_{f_1} - R_{f_2}) + (G_{f_1} - G_{f_2}) + (B_{f_1} - B_{f_2})}{(R_{k_1} - R_{k_2}) + (G_{k_1} - G_{k_2}) + (B_{k_1} - B_{k_2})}$$

$c_o = c_{\Delta_1} + \alpha_o c_{k_1} = c_{f_1} - (1 - \alpha_o) c_{k_1}$, or $c_o = c_{f_2} - (1 - \alpha_o) c_{k_2}$ The conditions of Theorem 3 are quite broad because only the sums of the primary color coordinates of the two background colors have to differ. In fact, a constant background color is not even required. The difference of the sums technique has been successfully employed to pull a matte on an object against a background of randomly colored pixels and then against that same random background but darkened by 50 percent. FIGS. 8A–8F shows the application of the technique in a realistic case.

The triangulation problem, with the complete information from the two shots against different background colors, can be expressed by this non-square matrix equation for an over determined system:

$$C_o \begin{bmatrix} 1 & 0 & 0 & 1 & 0 & 0 \\ 0 & 1 & 0 & 0 & 1 & 0 \\ 0 & 0 & 1 & 0 & 0 & 1 \\ -R_{k_1} & -G_{k_1} & -B_{k_1} & -R_{k_2} & -G_{k_2} & -B_{k_2} \end{bmatrix} =$$

$$[-R_{\Delta_1}\ -G_{\Delta_1}\ -B_{\Delta_1}\ -R_{\Delta_2}\ G_{\Delta_2}\ B_{\Delta_2}].$$

$[R_{\Delta_1} G_{\Delta_1} B_{\Delta_1} R_{\Delta_2} G_{\Delta_2} B_{\Delta_2}].$ The Theorem 3 form is obtained by adding the last three columns of the matrix and the last three elements of the vector.

The standard least squares way to solve this is to multiply both sides of the equation by the transpose of the matrix yielding:

$$C_o \begin{bmatrix} 2 & 0 & 0 & -(R_{k_1} + R_{k_2}) \\ 0 & 2 & 0 & -(G_{k_1} + G_{k_2}) \\ 0 & 0 & 2 & -(B_{k_1} + B_{k_2}) \\ -(R_{k_1} + R_{k_2}) & -(G_{k_1} + G_{k_2}) & -(B_{k_1} + B_{k_2}) & \Lambda \end{bmatrix} =$$

$$[R_{\Delta_1} + R_{\Delta_1}\ \ G_{\Delta_1} + G_{\Delta_2}\ \ B_{\Delta_1} + B_{\Delta_2}\ \ \Gamma\ ]$$

where $\Lambda = R_{k_1}^2 + G_{k_1}^2 + B_{k_1}^2 + R_{k_2}^2 + G_{k_2}^2 + B_{k_2}^2$ and $\Gamma = -(R_{k_1} R_{\Delta_1} + G_{k_1} G_{\Delta_1} + B_{k_1} B_{\Delta_1} + R_{k_2} R_{\Delta_2} + G_{k_2} G_{\Delta_2} + B_{k_2} B_{\Delta_2})$ $[R_{\Delta_1} + R_{\Delta_2} G_{\Delta_1} + G_{\Delta_2} B_{\Delta_1} + B_{\Delta_2} \Gamma]$ where $\Lambda = R_{k_1}^2 + G_{k_1}^2 + B_{k_1}^2 + R_{k_2}^2 + G_{k_2}^2 + B_{k_2}^2$ and $\Gamma = -(R_{k_1} R_{\Delta_1} + G_{k_1} G_{\Delta_1} + B_{k_1} B_{\Delta_1} + R_{k_2} R_{\Delta_2} + G_{k_2} G_{\Delta_2} + B_{k_2} B_{\Delta_2})$ Inverting the symmetric matrix and multiplying both sides by the inverse gives a least squares solution $C_o$ if the determinant of the matrix, $4((R_{k_1} - R_{k_2})^2 + (G_{k_1} - G_{k_2})^2 + (B_{k_1} - B_{k_2})^2)$, is non-zero. Thus, the most powerful result is obtained in Theorem 4.

Theorem 4 (Least squares). There is a solution $C_o$ to the Matting Problem if the uncomposited foreground object is known against two arbitrary background colors $C_{k_1}$ and $C_{k_2}$ with non-zero distance between them: $(R_{k_1} - R_{k_2})^2 + (G_{k_1} - G_{k_2})^2 + (B_{k_1} - B_{k_2})^2 \ne 0$ (i.e., they are distinct).

The desired alpha channel $\alpha_o$ can be shown to be:

$$\alpha_o = 1 - \frac{(R_{f_1} - R_{f_2})(R_{k_1} - R_{k_2}) + (G_{f_1} - G_{f_2})(G_{k_1} - G_{k_2}) + (B_{f_1} - B_{f_2})(B_{k_1} - B_{k_2})}{(R_{k_1} - R_{k_2})^2 + (G_{k_1} - G_{k_2})^2 + (B_{k_1} - B_{k_2})^2}.$$

The expressions of Theorems 3 and 4 for $\alpha_o$ are symmetric with respect to the two backgrounds, reflected in the two expressions for $c_o$ (in the proof of Theorem 3).

Theorems 2 and 3 are really just special cases of Theorem 4. For Theorem 2, the two colors are required to have different blue coordinates. For Theorem 3, (difference of the sums solution) corresponding points in each image have two arbitrary colors that do not have the same summed ($\Sigma$) value for the coordinates associated with each point. In practice, it has been observed that the simpler conditions of Theorem 3 often hold and permit use of computations less rigorous than those required for Theorem 4.

Theorem 4, the least squares solution, allows the use of very general backgrounds. In fact, two images of a foreground object moving across a fixed but varied background can satisfy Theorem 4, as shown in FIGS. 7E–7J. If the foreground object can be registered frame to frame as it moves from one side to the other, then the background relative to two different positions of the object can serve as the two backgrounds.

Notice that the Theorem 3 and 4 techniques lead to a background shadows solution whereas simple darkening of the background might not deal with shadows properly. As discussed above, the illumination levels and the direction of the lighting must be the same for the two backgrounds so that the shadows are the same densities and directions. The over determined linear system described above summarizes all information about two images of the foreground object against two different background colors. A third image of the foreground object against a third background color could be included as well, replacing the 4×6 matrix with a 4×9 matrix and the 1×6 right-hand vector with a 1×9 vector. Then the same least squares technique would be applied to find a solution for this even more over determined problem. Similarly, a fourth, fifth, etc. image of the foreground object against even more backgrounds of different colors could be used. Although an over determined system may be subject to numerical instabilities in its solution, in reducing the present invention to practice none were experienced. If numerical instabilities did arise, a technique of singular value decomposition may be used such as that disclosed in *Numerical Recipes in C*, PRESS, W. H., TEUKOLOSKY, S. A., VETTERLING, W. T., and FLANNERY, B. P., Cambridge University Press, Cambridge, 1988, p. 59.

Theorem 5—General Matting Case with n Backing Colors. There is a solution $C_o$ to the Matting Problem if the uncomposited foreground object is known against n arbitrary background colors $C_{k_1}, C_{k_2}, \ldots, C_{k_n}$, where:

$$n\Sigma(R_{k_i}^2+G_{k_i}^2+B_{k_i}^2)-(\Sigma^2 R_{k_i}+\Sigma^2 G_{k_i}+\Sigma^2 B_{k_i})\neq 0$$

All sums are taken over i from 1 to n, and the sum squared symbol $\Sigma^2$ means to take the sum over all i, as usual, then square the result.

It can be shown that this condition is equivalent to: "The sum of all possible pairwise color distances (squared) is non-zero," which is equivalent to: "At least two of the $C_{k_i}$ must be distinct," which is a relatively "loose" condition.

The alpha value for the Theorem 5 least squares technique can be shown to be:

$$\alpha_0 = 1 - \frac{n\sum(R_{f_i}R_{k_i}+G_{f_i}G_{k_i}+B_{f_i}B_{k_i}) - (\sum R_{f_i}\sum R_{k_i}+\sum G_{f_i}\sum G_{k_i}+\sum B_{f_i}\sum B_{k_i})}{n\sum(R_{k_i}^2+G_{k_i}^2+B_{k_i}^2) - (\Sigma^2 R_{k_i}+\Sigma^2 G_{k_i}+\Sigma^2 B_{k_i})}$$

These results are readily derived using the same least squares and linear algebra techniques as used for the case n=2 in Theorem 4. This alpha can also be shown to be equivalent to:

$$\alpha_0 = 1 - \frac{\sum_{j<i}[(R_{f_i}-R_{f_j})(R_{k_i}-R_{k_j}) + (G_{f_i}-G_{f_j})(G_{k_i}-G_{k_j}) + (B_{f_i}-B_{f_j})(B_{k_i}-B_{k_j})]}{\sum_{j<i}(R_{k_i}-R_{k_j})^2 + (G_{k_i}-G_{k_j})^2 + (B_{k_i}-B_{k_j})^2}$$

Here the sums are taken over all i from 1 to n and over all j from 1 to i−1. So this form is in terms of color differences as in the statement and solution of Theorem 4. Notice that the denominator of the preceding equation is the sum of the Euclidean distances (squared) between all possible color pairs.

Bounding the Value of the Alpha Channel

It might seem that the problems, which have Solutions 1 and 2, and Theorem 1 generalizations, are unrealistically restrictive of foreground object colors. However, much of the real-world work approaches the conditions of these solutions and generalization. Situations arising from Solution 3, and Theorems 2–4 generalizations, require a doubling of recorded images, which may be difficult to achieve. If the search space of possible solutions for deriving $\alpha_o$ in the general single-background case is bounded, Solutions 1 and 2, and Theorem 1 may be implemented when the premises are less than ideal.

Any $C_o$ offered as solution must satisfy the physical limits on color. It must be that for a color component red, $0 \leq R_o \leq \alpha_o$ (since $R_o$ is premultiplied by $\alpha_o$). Similar relationships are true of the green and blue components, $G_o$ and $B_o$. The Matting Equation gives $R_f = R_o + (1-\alpha_o)R_k$. The inequalities for $R_o$ applied to this expression give:

$$(1-\alpha_o)R_k \leq R_f \leq (1-\alpha_o)R_k + \alpha_o,$$

with the left side being the expression for $R_o=0$ and the right for $R_o=\alpha_o$. Similar inequalities apply to $G_f$ and $B_f$.

Figure 10A:
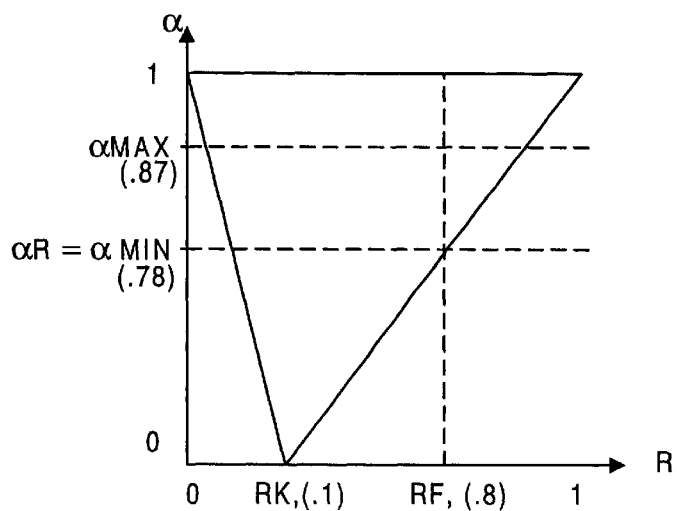
FIG. 10A is graph that represents the red solution space for a point of an image of a foreground object.
Figure 10B:
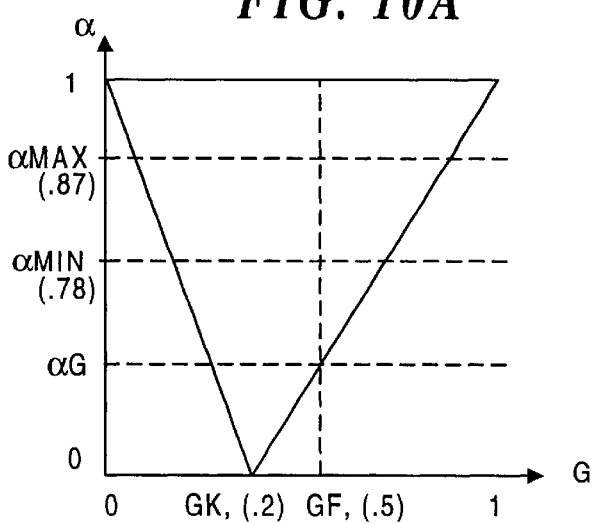
FIG. 10B is a graph that represents the green solution space for the point of the image of the foreground object.
Figure 10C:
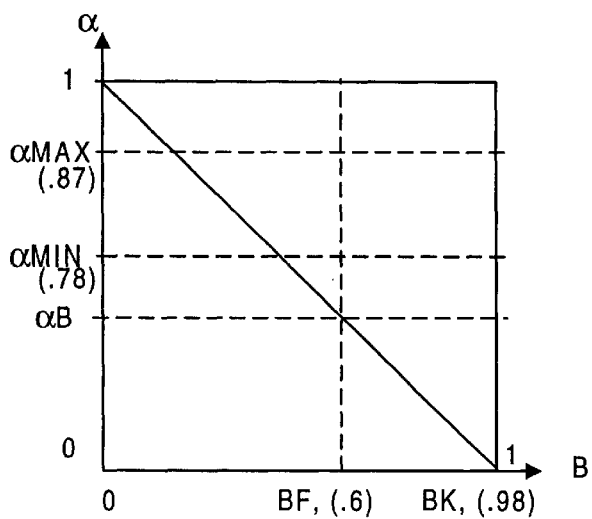
FIG. 10C is a graph that represents the blue solution space for the point of the image of the foreground object.

For a given $C_o$, FIG. 10A is the red color space, FIG. 10B is the green color space, and FIG. 10C is the blue color space. FIGS. 10A–10C show all regions of valid combinations of $\alpha_o$, $R_f$, $G_f$, and $B_f$ using equality in the relationship(s) above as boundaries. The color $c_k$ for FIGS. 10A–10C is taken to be the slightly impure blue [0.1 0.2 0.98].

The dashed vertical lines in FIGS. 10A–10C represent a given $c_f$ in this figure, [0.8 0.5 0.6]. The dotted horizontal lines represent the minimum $\alpha_o$ for each of $R_f$, $G_f$, and $B_f$, which gives valid results for $R_o$, $G_o$, and $B_o$, respectively. Let these three $\alpha_o$'s be $\alpha_R$, $\alpha_G$, and $\alpha_B$. Since only one $\alpha_o$ is generated per color, the following relationship must be true:

$$\alpha_o \geq \max(\alpha_R, \alpha_G, \alpha_B).$$

The $\alpha_o$ that satisfies this relationship at equality $\alpha_{min}$, and for any $\alpha_o \geq \alpha_{min}$ will be a valid one. Notice that although the range of possible $\alpha_o$'s is reduced by this derivation, there are still an infinity of valid ones to choose from, and hence, an infinity of solutions.

If $R_f > R_k$, as in the example of FIG. 10A, then $\alpha_R$ corresponds to $R_o = \alpha_o$, on the right side of the inequalities noted above for $R_f$ and $\alpha_o$. If $R_f < R_k$ then $\alpha_R$ corresponds to $R_o = 0$, on the left side of these inequalities. Thus, $$\alpha_R = \begin{cases} 1 - \frac{R_f}{R_k}, & \text{if } R_f < R_k \\ \frac{R_\Delta}{1-R_k}, & \text{if } R_f > R_k \\ 0, & \text{if } R_f = R_k \end{cases}$$

In the example of FIGS. 10A–10C, $\alpha_{min} \approx 0.78$. For the special case of pure blue background, $\alpha_{min} = \max(R_f, G_f, 1-B_f)$. So long as a valid $\alpha_o$ exists, a foreground object color can be derived from the given $c_f$ by $c_o = c_A + \alpha_o c_k$ as before.

An upper bound may also be established for $\alpha_o$ by extending the assumption presented in U.S. Pat. No. 4,100,569 (Vlahos).

The Vlahos assumption, when valid, has $B_o \leq a_2 G_o$. The rearrangement of the Matting Equation above for the green channel is then:

$$G_o = G_f - (1-\alpha_o)G_k.$$

Another rearrangement, this time for the blue channel, gives:

$$\alpha_o = 1 + \frac{B_o - B_f}{B_k} \leq 1 + \frac{a_2 G_o - B_j}{B_k}.$$

Combining these two relationships, by substituting the equation for $G_o$ into the inequality for $\alpha_o$ and solving, gives:

$$\alpha_o \leq 1 - \frac{B_f - a_2 G_f}{B_k - a_2 G_k},$$

clamped to [0, 1] if necessary. Recall that $0.5 \leq a_2 \leq 1.5$ typically. Let $\alpha_o$ at equality be $\alpha_{max}$. Then, in the example of FIGS. 10A–10C, $a_2=1$ yields $\alpha_{max} \approx 0.87$, which constrains the possible solutions a bit more so that: $0.78 \leq \alpha_o \leq 0.87$.

Bounding the upper and lower possible values for $\alpha_o$ verifies the determined value provided by the solutions discussed above. Also, the mathematical computations employed to derive the value of $\alpha_o$ may be reduced when the solution space is bounded.

Implementation of Triangulation

With reference to FIG. 1, apparatus 100 for implementing a first step of the preferred embodiment for triangulating single film images having two different backgrounds is shown. A camera 102 is disposed a predefined distance x1 from a first background 110. If camera 102 is digital, it will preferably be coupled to a computer 104 so that a digital image recorded by the camera is directly inputted to the computer. Alternatively, the digital image may be stored on memory media and later transferred into computer 104. However, if camera 102 is an analog device, a recorded analog image will be provided to a digitizer 116 for scanning. Once the analog image is processed by the digitizer, a corresponding digital image will be supplied to computer 104. A display 106 is coupled to computer 104 so that received and processed images may be viewed by a user. A stationary light source 108 provides a constant light that is incident upon a first background 110, which is shown positioned directly in front of a second background 112. An image or picture of first background 110 is recorded by camera 102. (Note that in this disclosure and the claims that follow, the term "picture" is considered synonymous with the noun "image.")

Figure 2:
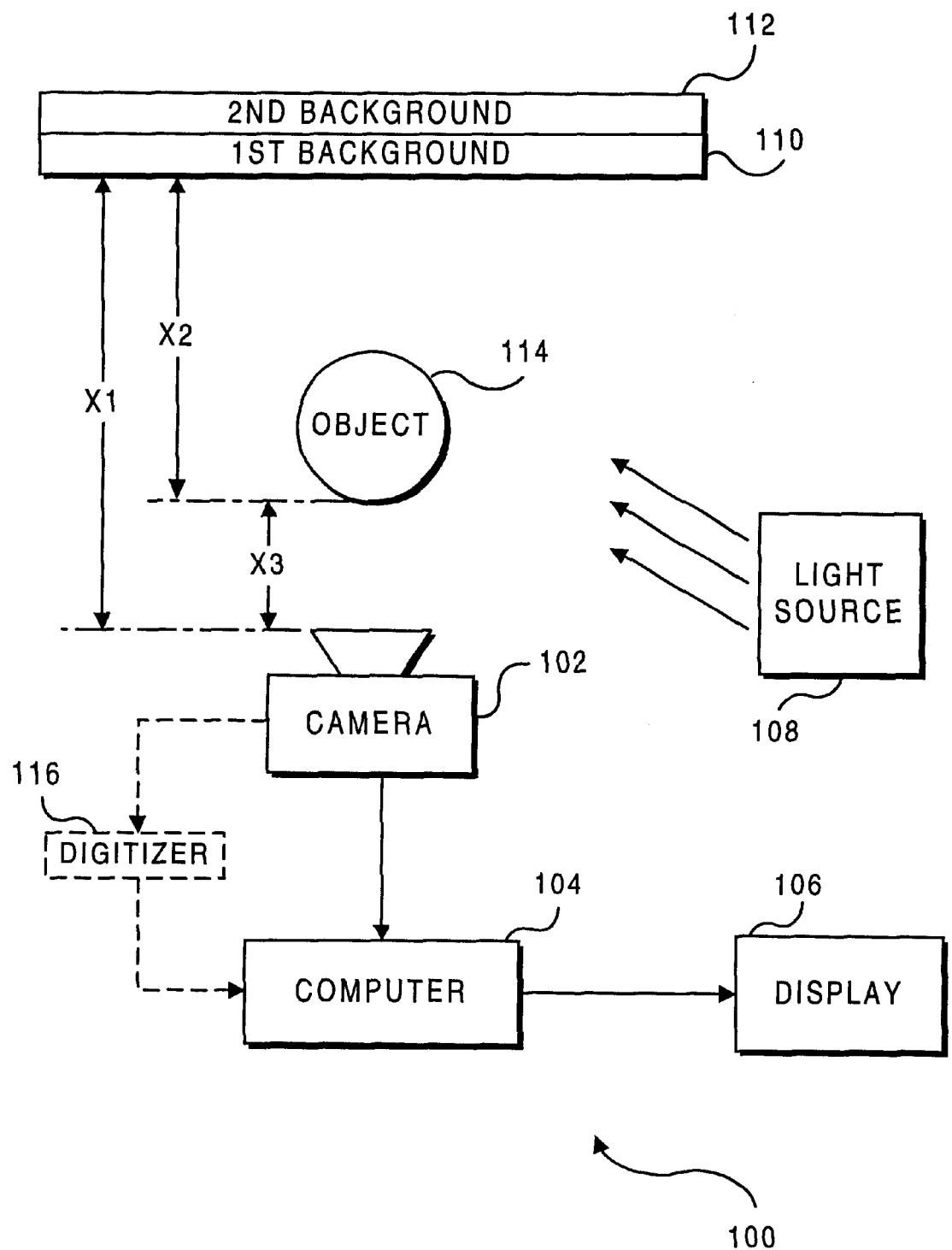
FIG. 2 is a schematic block diagram illustrating the second step of the preferred embodiment.

Moving now to a FIG. 2, a second arrangement 100 of the apparatus is shown. An object 114 is positioned in the region between camera 102 and first background 110 and disposed at a distance x3 from camera 102 and at a distance x2 from the surface of first background 110. Light source 108 provides a constant light that illuminates object 114 and first background 110 in the same manner as when recording the image of only the first background (FIG. 1). An image of object 114 and first background 110 is recorded by camera 102.

Figure 3:
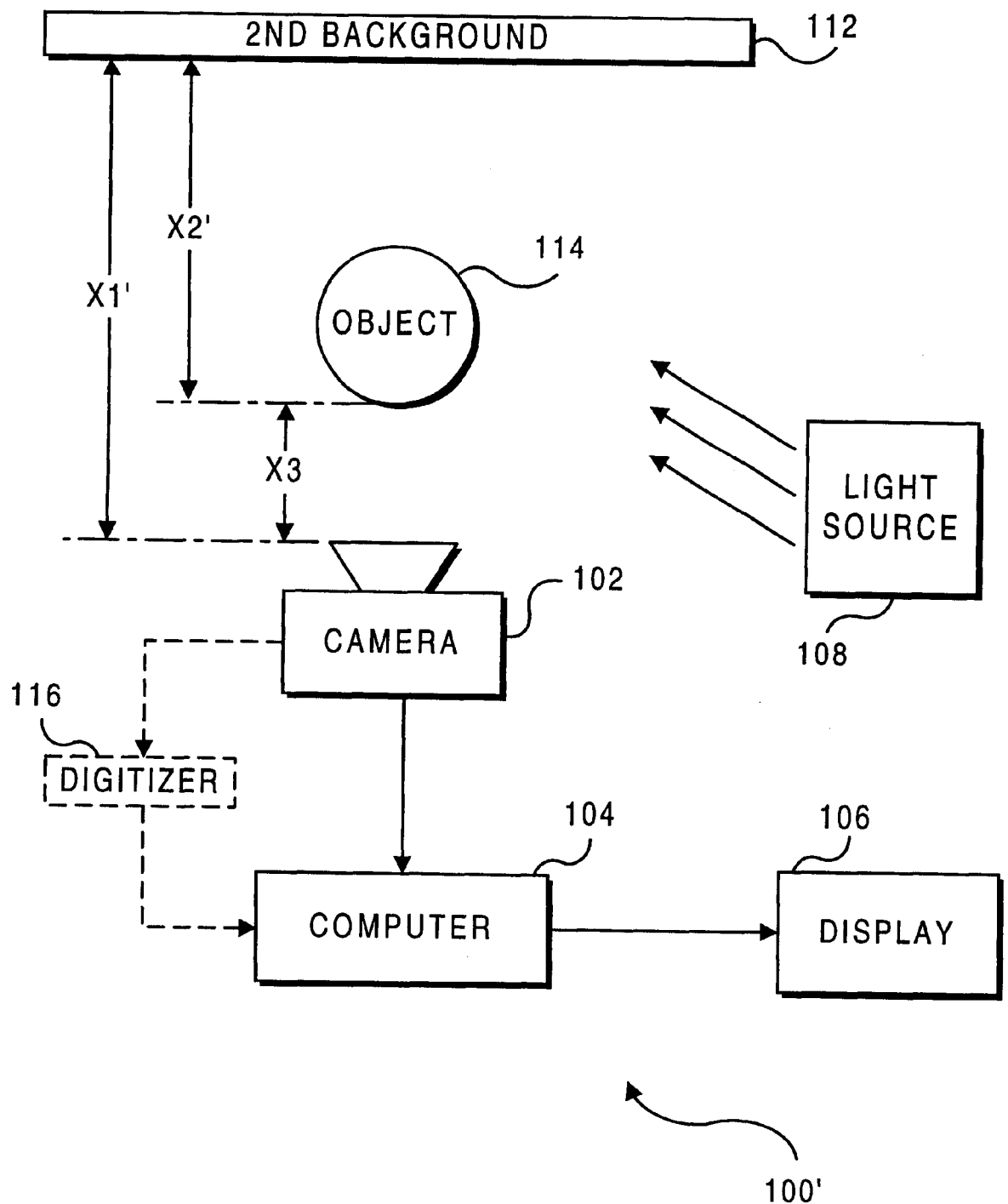
FIG. 3 is a schematic block diagram depicting the third step of the preferred embodiment.

In FIG. 3, a third step of the preferred embodiment for triangulating single film images having two different backgrounds is shown relative to an apparatus 100'. Relative to FIG. 2, first background 110 has been removed, and object 114 is now disposed between camera 102 and second background 112. Distance x1' between camera 102 and second background 112 is approximately equal to the distance x1 between camera 102 and first background 110 in FIG. 2. Further, a distance x2' between the front surface of object 114 and second background 112 approximately equals the distance x2 between object 114 and first background 110 as shown in FIG. 2. Typically, the thickness of first background 110 is so small that any differences in the distances x1 and x1', or x2 and x2' are insignificant. Light source 108 illuminates object 114 and second background 112 in the same manner as when recording the image of first background 110 and object 114. An image of object 114 and second background 110 is thus recorded by camera 102.

Figure 4:
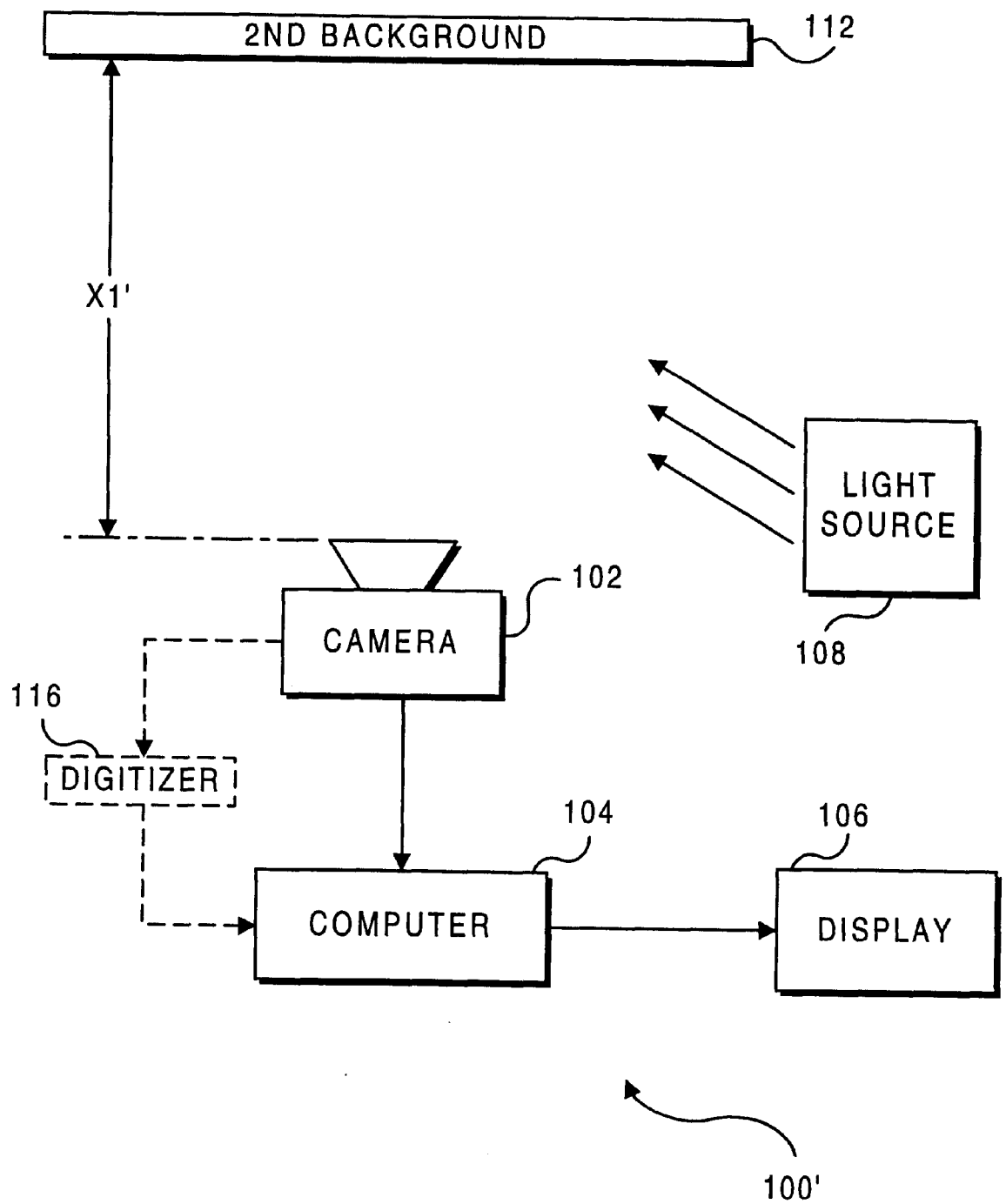
FIG. 4 is a schematic block diagram showing the fourth step of the preferred embodiment.

FIG. 4 shows a fourth step of the preferred embodiment for triangulating single film images having two different backgrounds. Object 114 has been removed from the position between camera 102 and second background 112 as shown in FIG. 3. The distance x1' between camera 102 and second background 112 remains approximately equal to the distance x1 between camera 102 and first background 110 as depicted in FIG. 2. Light source 108 illuminates second background 112 in the same manner as when recording the image of second background 112 and object 114. An image of second background 110 is recorded by camera 102.

At each step in the preferred embodiment for triangulating single film images, an image recorded by camera 102 is provided to computer 104 so that two pairs of images, one with and one without object 114, are recorded against two different backgrounds.

Figure 5:
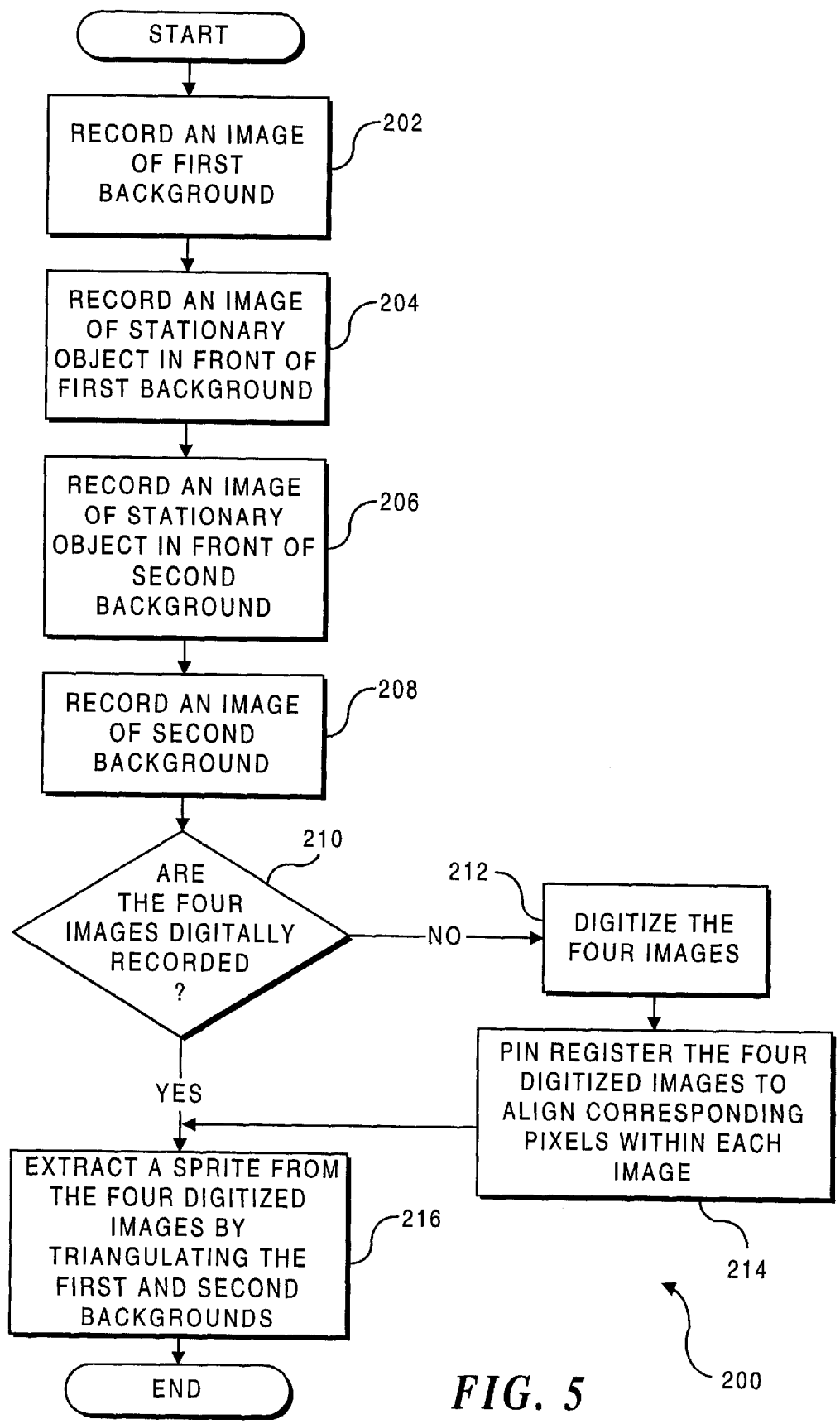
FIG. 5 is a flow chart showing the overall steps of the present method for pulling a matte of a foreground object using two different background scenes.

In FIG. 5, a flow chart depicts an overview 200 of the steps of the preferred embodiment for pulling a matte of object 114 by triangulating two pairs of single film images having two different backgrounds, as depicted in FIGS. 1–4. A block 202 provides for recording an image of the first background. In a block 204, an image is recorded of object 114 disposed in front of first background 110. Next, in a block 206, an image is recorded of object 114 disposed in front of second background 112. In a block 208, an image is recorded of second background 112 alone. A decision block 210 provides for determining whether the four images were digitally recorded. If not, the procedure advances to a block 212, which the four images are converted into a digital format that is recognizable by computer 104. The computer corrects any misalignment of the four digitized images by registering each pixel within each image with each corresponding pixel in each of the other images as noted in a block 214. A block 216 indicates that a matte of the object is pulled from the four digitized images by employing an appropriate triangulation solution. Additionally, block 216 is implemented if the determination at block 210 is true. The pulled matte of object 114 may then be employed to produce a new composite image.

The triangulation of the recorded images may employ at least two different techniques to pull a matte of object 114. As discussed above, Theorem 3 (difference of the sums) may be used if the sums of each color coordinate for each pixel in the image of the first background minus the sums of each color coordinate of each corresponding pixel in the image of the second background do not equal zero. Alternatively, Theorem 4 (least squares) may be employed if the colors of the backgrounds are different, i.e., the sum of the squares of the differences between each color coordinate for each pixel in the image of the first background and each color coordinate of each corresponding pixel in the second background do not equal zero. Theorem 3 is less computationally intensive than Theorem 4. However, Theorem 4 may be more accurate in determining a value for the alpha channel of the image of object 114 than Theorem 3 if more than two pairs of images having different backgrounds are employed to pull a matte of the object.

Figure 6:
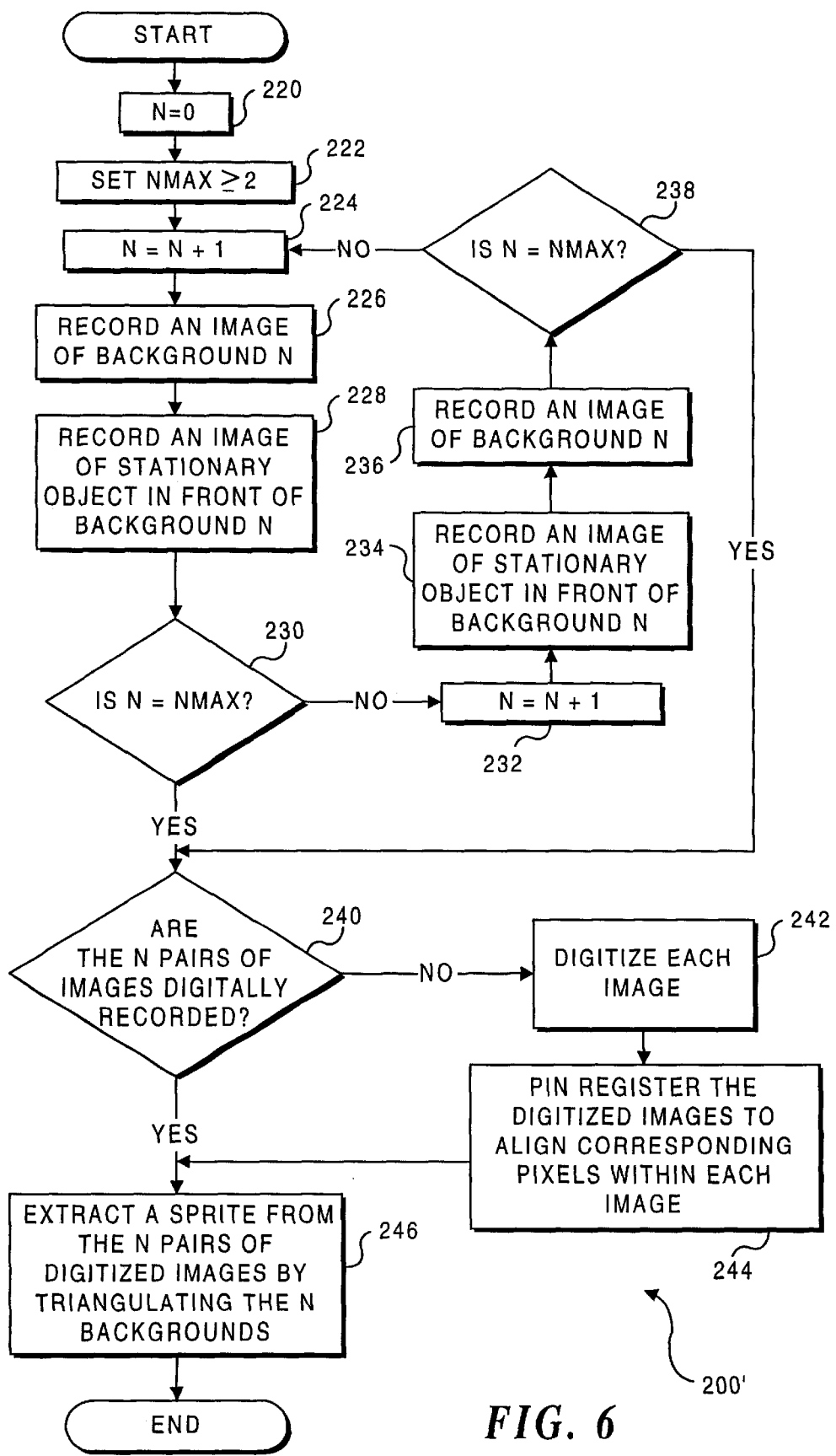
FIG. 6 is a flow chart illustrating the steps used to pull a matte of a foreground object from n different backgrounds.

Looking now to FIG. 6, a functional block diagram shows a generalized overview 200' of the steps for pulling a matte of object 114 by triangulating n pairs of single film images having n different backgrounds. A block 220 notes that the value n is initially set to zero. In a block 222, a variable (nmax) is initialized with an integer value equal to or greater than two, corresponding to the number n of the different backgrounds that will be recorded. In a block 224, the value of n is incremented by one. A block 226 provides for recording an image of a background n. Next, in a block 228, an image of a foreground object disposed in front of a background n is recorded. A determination is made whether the value of n is equal to the value of nmax in a decision block 230. If not, the procedure advances to a block 232 in which the value of n is incremented by one. Stepping to a block 234, an image of the foreground object disposed over a new background n (as incremented) is recorded. In a block 236, an image is recorded of the new background alone. Moving to a decision block 238, a determination is made whether the value of n is equal to nmax. If not, returning to block 224, the procedure recursively implements the steps described above.

Once the determination at decision block 238 is true or if the determination at decision block 230 is true, the procedure continues with a decision block 240. Decision block 240 determines whether the recorded images are digital or analog. If the recorded images are analog images, a block 242 provides for converting each analog image into an image that has a digital format recognizable by the computer.

Any misalignment of the four digitized images is corrected in a block 244 by registering each pixel within each image with each corresponding pixel of each of the other images. This step is extremely important for analog images because the movement of film and resulting variation is the plane of the film within a camera can cause misalignment of sequentially recorded images. Moving to a block 246, a matte of the foreground object is pulled from the digitized images by triangulating the corresponding pixels of the single film images having n different backgrounds. Block 246 is also implemented if the determination at decision block 240 is true. As discussed above, at least two different techniques (Theorem 3 and Theorem 4) may be used to triangulate corresponding pixels. The pulled matte of the foreground object may then be employed to produce a new composite image.

Figure 7C:
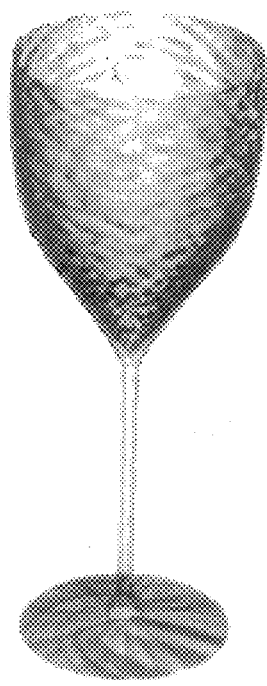
FIG. 7C is color picture of an uncomposited image (pulled matte) of the goblet.
Figure 7D:
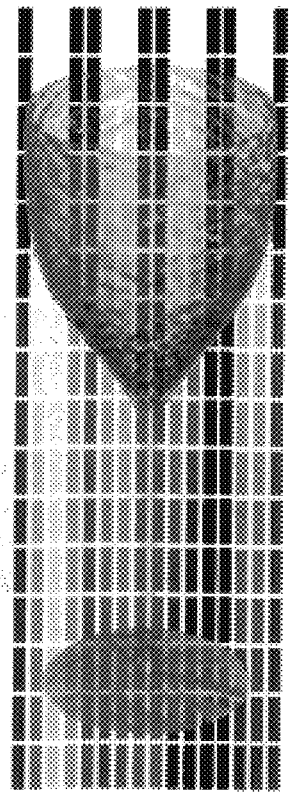
FIG. 7D is a color picture of the pulled matte of the goblet composited over a new background having a plurality of colors.
Figure 7E:
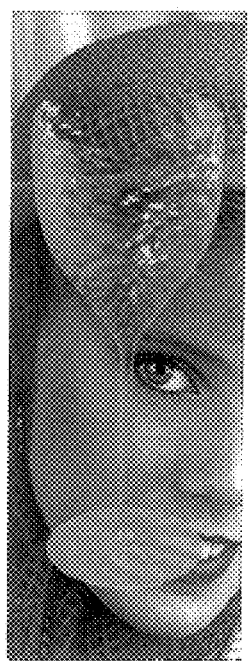
FIG. 7E is a color picture of the goblet disposed over a portion of a known background.
Figure 7F:
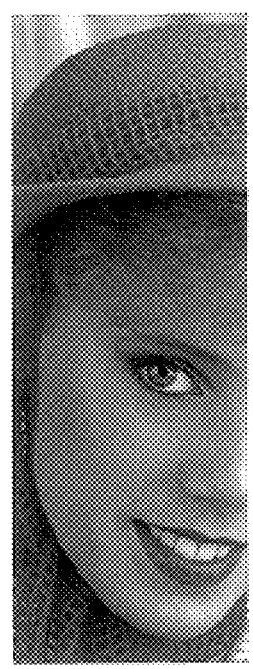
FIG. 7F is a color picture of the portion of the known background without the goblet.
Figure 7G:
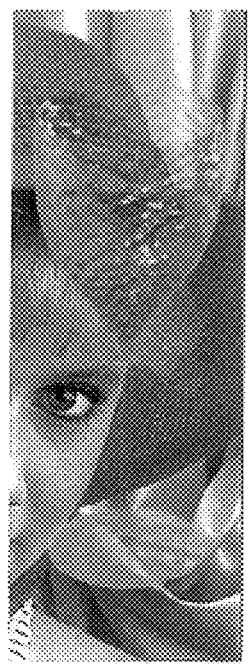
FIG. 7G is a color picture of the goblet disposed over another portion of the known background.
Figure 7H:
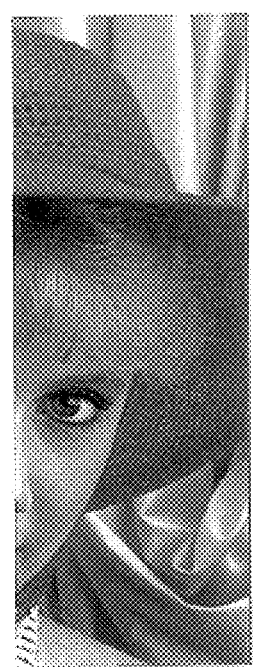
FIG. 7H is a color picture of the other portion of the known background without the goblet.
Figure 7I:
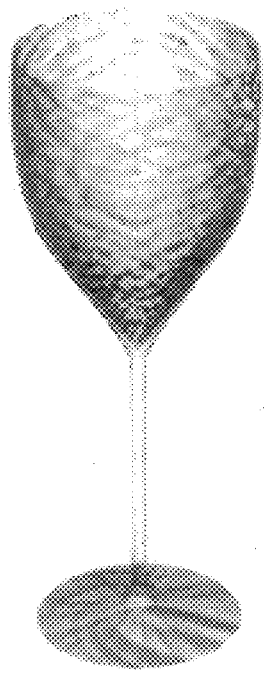
FIG. 7I is a color picture of an uncomposited image (pulled matte) of the goblet.
Figure 7J:
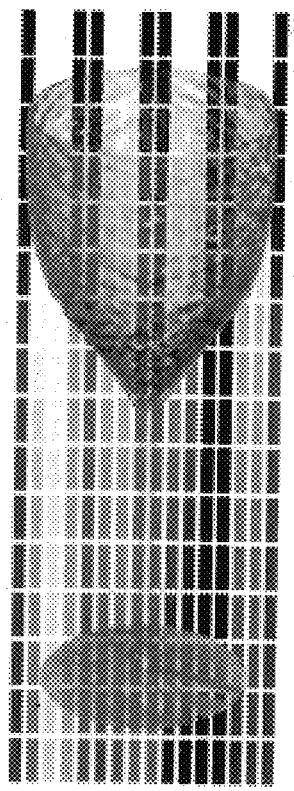
FIG. 7J is a color picture of the pulled matte of the goblet composited over a new background having a plurality of colors.

The color images presented in FIGS. 7A–7D fit the criteria of Theorem 2 (actually the Solution 3 special case) perfectly because the given blue foreground (FIG. 7A) and black (FIG. 7B) foreground images were manufactured by compositing the foreground object over perfectly pure blue and black backgrounds, respectively. As predicted by Theorem 2, the foreground object was extracted in its original form (FIG. 7C), with only small least significant bit errors being visible in the new composite image (FIG. 7D). Similarly, FIGS. 7E–7J illustrate the successful implementation of the preferred embodiment with a rigidly moving foreground object disposed over an arbitrarily colored background.

Figure 8A:
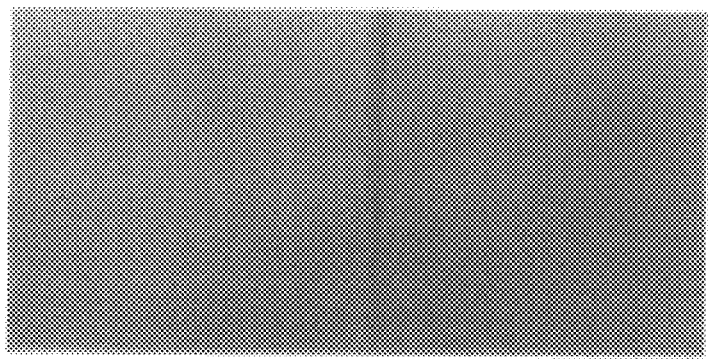
FIG. 8A is a color picture of a first background that has a varying color.
Figure 8C:
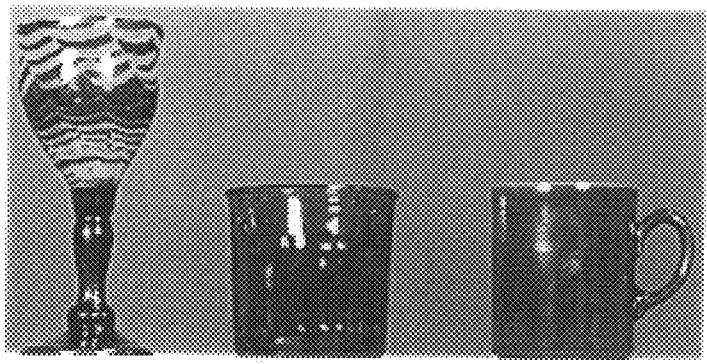
FIG. 8C is a color picture of foreground objects (goblet and cups that have a blue color) disposed over the first background.
Figure 8B:
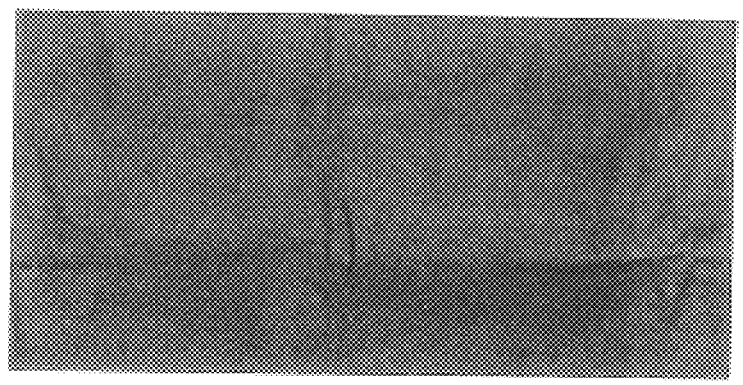
FIG. 8B is a color picture of a second background that has a varying color.
Figure 8D:
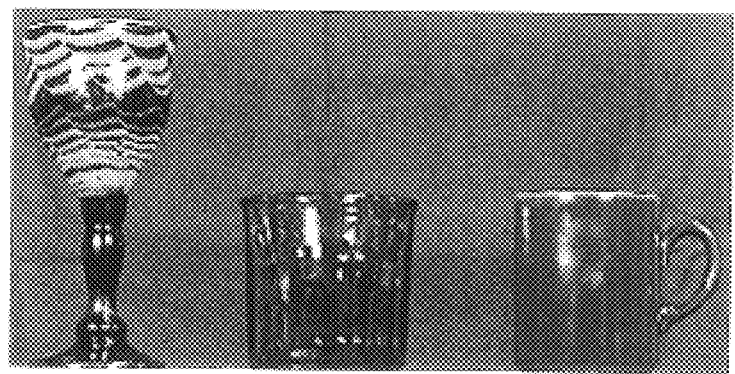
FIG. 8D is a color picture of foreground objects disposed over the second background.
Figure 8E:
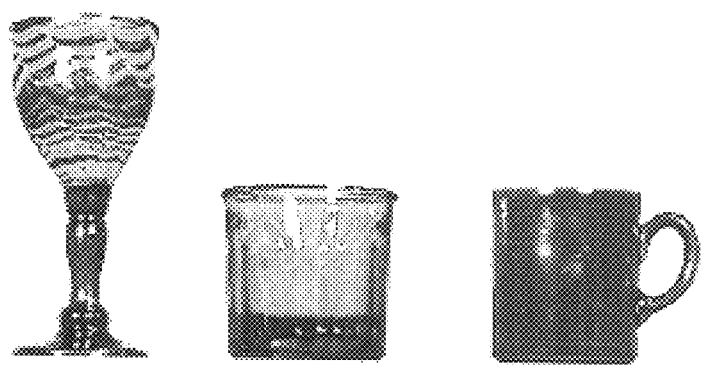
FIG. 8E is a color picture of an uncomposited image (pulled matte) of the foreground objects.
Figure 8F:
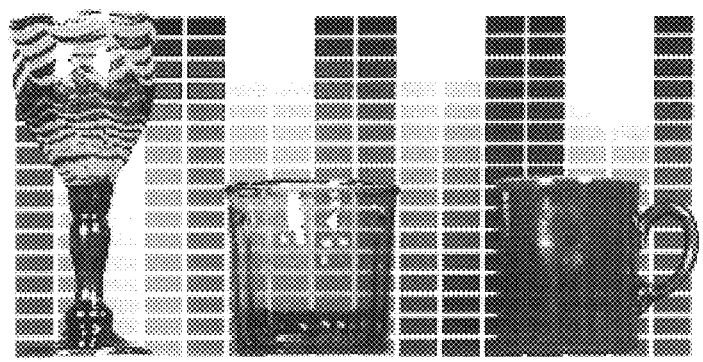
FIG. 8F is a color picture of the pulled matte of the foreground objects composited over a new background having a plurality of colors.

FIGS. 8A–8D provide a set of color images (film) of foreground objects disposed over two different backgrounds, and the two backgrounds alone. Each background has a predominate color that varies across its breadth. FIG. 8E is the pulled matte of the foreground objects, and FIG. 8F is a new composite image of the objects. The camera was locked down for recording the two images (FIGS. 8C–8D) required by Theorem 3 (sum of differences) and Theorem 4 (least squares) and the two extra images (FIGS. 8A–8B), which are necessary for calibrating the color of the images of the two backgrounds as discussed above. Furthermore, the same exposure and illumination was used for recording the four images, and a remote-controlled shutter guarded against slight camera movements.

The resulting image of FIG. 8F demonstrates the effectiveness of the preferred embodiment, but it is nevertheless flawed due to misregistration introduced during the filming process. A primary source of the misregistration may be caused by the slight misalignment of the film in the camera as sequential exposures (images) are recorded. If pin registration had been employed in the filming and digitization (scanning) of the film images, the misregistration in FIG. 8F would have been corrected. Additionally, the foreground objects in front of different backgrounds have a slightly different brightness, relative to one another, which is an artifact caused by scanning.

Figure 9:
FIG. 9 is a color picture of a composite image that contains nine sprites, the mattes of which were pulled using the preferred embodiment of the present invention.

FIG. 9 is a composite image of nine sprites. The matte for each sprite was pulled with the preferred embodiment of the present invention i.e., recording an image of each foreground object over two different backgrounds and triangulating the color values of the images to pull the matte.

It is important to note from the Theorem 3 and 4 expressions for $\alpha_o$ that both triangulation techniques are quite sensitive to brightness and misregistration errors. If the foreground colors differ where they should be equal, then $\alpha_o$ is decreased from its correct value of 1, permitting some object transparency. In general, the triangulation techniques tend to err towards increased transparency.

Another manifestation of misregistration error is called the "fine line" problem. Consider a thin dark line with bright surroundings in a foreground image recorded against one background, or the complement, a thin bright line in dark surroundings. Such a line in slight misregistration with itself against the other background may differ dramatically in brightness at the pixels along the line, and will be seen by the triangulation solution. Since misregistration error tends toward transparency, the error will cause the appearance of a fine transparent line in a pulled matte of a foreground object. Thus, effective use of the preferred embodiment implies that pin-registered filming and digitization or a digital camera should be employed to ensure positional constancy between the four filmed images. Additionally, the lighting of the foreground object and the camera exposure should be precisely controlled so that a constant brightness for each foreground object is provided during the recording of the images on a film strip (or other recording medium).

Since the preferred embodiment is intended to work with non-moving objects (excluding rigid motions, such as simple translation), brightness variations and other sources of noise may be reduced by averaging the values of several repeatedly recorded images at each step of the recording process. Rigidly moving an object includes rotating and linearly displacing the object so that a constant distance is maintained between the object and the camera during the recording of multiple images. Further, a digital camera may be employed to record the images so that scanning artifacts are eliminated, and so that the frequency with which recorded images are misregistered is reduced.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for extracting an image of a foreground object from composite images, using a computer, comprising the steps of:

(a) recording a first composite image that includes the foreground object disposed in front of a first background having a first arbitrary coloring;

(b) recording a second composite image that includes the foreground object disposed in front of a second background having a second arbitrary coloring that is different than the first arbitrary coloring;

(c) obtaining a set of color coordinates for each point in the first composite image and in the second composite image, said color coordinates defining a color for each point; and (d) triangulating the set of color coordinates for each point in each of the first and the second composite images, the step of triangulating returning an alpha value and a set of color coordinates for each point in the image of the foreground object, to define the image of the foreground object apart from any background.

2. The method of claim 1, further comprising the step of digitizing the first composite image and the second composite image to produce the set of color coordinates for each point in each of the first and the second composite images.

3. The method of claim 2, further comprising the step of aligning each point of the first composite image with a corresponding point disposed within the second composite image.

4. The method of claim 1, wherein the step of triangulating comprises the steps of:

(a) recording a first background image that includes the first background, but not the foreground object;

(b) recording a second background image that includes the second background, but not the foreground object; and (c) determining a set of color coordinates for each point in the first background image and for each point in the second background image, the set of color coordinates that define the foreground object apart from any background being determined as a function of the set of color coordinates for each of the points in the first and the second background images and in the first and second composite images.

5. The method of claim 1, wherein, the set of color coordinates for each of the first and the second composite images indicate values for a red color, a green color, and a blue color, at each of the points in said images.

6. The method of claim 5, wherein each point in the first background image has a color that is different than that of a corresponding point in the second background image, so that a sum of differences between the values for the red color, the green color and the blue color, respectively, for corresponding points in the first background and the second background is not equal to zero.

7. The method of claim 5, wherein each point in the first background image has a color that is different than that of a corresponding point in the second background image, so that a sum of squared differences between the values for the red color, the green color and the blue color, respectively, for corresponding points in the first background and the second background is not equal to zero.

8. The method of claim 1, wherein a constant illumination of the foreground object and the first and second background is employed during the steps of recording the first and the second composite images.

9. The method of claim 1, wherein a camera is used to record the first and the second composite images, and wherein substantially constant distances are maintained between the foreground object and the camera, and between the foreground object and the first and second backgrounds during the step of recording the first and the second composite images with the camera.

10. The method of claim 1, wherein the first background is an arbitrary pure color and the second background is a different, but otherwise arbitrary pure color.

11. The method of claim 4, wherein the step of triangulating employs a difference of sums technique to determine the value of the alpha channel and the set of color coordinates for each point in the image of the foreground object, as a function of said sets of color coordinates for the first and second composite images, and for the first and second background images.

12. The method of claim 4, wherein the step of triangulating employs a least squares technique to determine the value of the alpha channel and the set of color coordinates for each point in the image of the foreground object, as a function of the sets of color coordinates for the first and second composite images, and for the first and second background images.

13. The method of claim 1, further comprising the steps of:

(a) determining a lower limit of the alpha value for each point in the image of the foreground object as a function of the set of color coordinates for the point;

(b) determining an upper limit of the alpha value for each point in the image of the foreground object as a function of the set of color coordinates for the point;

(c) employing said lower limit and said upper limit to define a range for the alpha value at each point in the image of the foreground object.

14. The method of claim 1, further comprising the steps of:

(a) recording a first scene of the foreground object disposed in front of a first portion of a background but not in front of a second portion of the background, the first and second portions of said background having a different coloring, a section of said first scene that includes the foreground object disposed in front of the first portion of the background being employed to define the first composite image and another section of said first scene that includes the second portion of the background being employed to define a second background image; and (b) recording a second scene of the foreground object disposed in front of the second portion of the background, but not in front of the first portion of the background, a section of said second scene that includes the foreground object disposed in front of the second portion of the background being employed to define the second composite image and another section of said second scene that includes the first portion of the background being employed to define a first background image; and (c) obtaining a set of color coordinates for each point in the first background image and for each point in the second background image, the set of color coordinates that define the foreground object apart from any background being determined as a function of the set of color coordinates for:

(i) each point in the first and second background images; and (ii) each point in the first and second composite images.

15. The method of claim 14, further comprising the step of rigidly moving the foreground object relative to the background when recording the first and second scenes.

16. The method of claim 14, wherein the first portion and the second portions of the background overlap.

17. The method of claim 1, further comprising, the steps of:
(a) similarly recording a plurality of images of a scene for each composite image;
(b) obtaining a plurality of sets of color coordinates for each point of said plurality of images;
(c) averaging said plurality of sets of color coordinates to produce the set of color coordinates for each point in each composite image.

18. The method of claim 1, further comprising the steps of:
(a) recording n minus two additional composite images, each of said additional composite images including the foreground object disposed in front of a different background having an arbitrary coloring that is different than the arbitrary coloring of any other backgrounds;
(b) obtaining a set of color coordinates for each point in the additional composite images, said color coordinates defining a color for each point; and
(c) triangulating the set of color coordinates for each point in each of the first, the second, and the n minus two additional composite images, the step of triangulating returning the alpha value and the set of color coordinates for each point in the image of the foreground object.

19. The method of claim 1, wherein the image of the foreground object includes a shadow of the foreground object cast on the first and the second backgrounds.

20. A system for extracting an image of a foreground object from composite images, comprising:
(a) a processor;
(b) an interface, coupled to the processor, for input of digitized signals corresponding to the composite images;
(b) a memory coupled to the processor, for storing machine instructions and data defined by said digitized signals, said machine instructions causing the processor to implement a plurality of functions using the digitized signals, including:
(i) entering data into the memory corresponding to the digitized signals that define a composite image of the foreground object disposed in front of a first background having a first arbitrary coloring;
(ii) entering data into the memory corresponding to the digitized signals that define a second composite image of the foreground object disposed in front of a second background having a second arbitrary coloring that is different than the first arbitrary coloring; and
(iii) using the data stored in the memory, triangulating a set of color coordinates for each point in each of the first and the second composite images, returning an alpha value and a set of color coordinates for each point in the image of the foreground object, to define the image of the foreground object apart from any background.

21. The system of claim 20, further comprising an analog camera to record the first and the second composite images; and a digitizer to convert said first and second composite images into the digital signal that is input to the interface.

22. The system of claim 20, further comprising a digital camera that produces the digital signal defining the first and the second composite images.

23. The system of claim 20, wherein the functions further include using the digitized signals while aligning each point of the first composite image with a corresponding point disposed within the second composite image.

24. The system of claim 20, wherein while triangulating the data stored in memory, the processor:
(a) enters data into the memory, said data corresponding to the digitized signals that define a first background image including the first background, but not the foreground object;
(b) enters data into the memory, said data corresponding to the digitized signals that define a second background image including the second background, but not the foreground object; and
(c) determines a set of color coordinates for each point in the first background image and for each point in the second background image, the set of color coordinates that define the foreground object apart from any background being determined as a function of:
(i) the set of color coordinates for each of the points in the first and the second background images; and
(ii) the set of color coordinates for each of the points in the first and second composite images.

25. The system of claim 20, wherein, the set of color coordinates for each of the first and the second composite images indicate values for a red color, a green color, and a blue color, at each of the points in said images.

26. The system of claim 25, wherein each point in the first background image has a color that is different than that of a corresponding point in the second background image, so that a sum of differences between the values for the red color, the green color and the blue color, respectively, for corresponding points in the first background and the second background, is not equal to zero.

27. The system of claim 20, wherein each point in the first background image has a color that is different than that of a corresponding point in the second background image, so that a sum of squared differences between the values for the red color, the green color and the blue color, respectively, for corresponding points in the first background and the second background, is not equal to zero.

28. The system of claim 20, wherein a constant illumination of the foreground object and of the first and second background is employed during the recording of the first and the second composite images that are defined by the digitized signals.

29. The system of claim 20, wherein substantially constant distances are maintained between the foreground object and a camera, and between the foreground object and the first and second backgrounds, during the recording of the first and the second composite images that are defined by the digitized signals.

30. The system of claim 20, wherein the first background is an arbitrary pure color and the second background is a different, but otherwise arbitrary pure color.

31. The system of claim 24, wherein triangulating the data stored in memory further includes a difference of sums technique to determine the value of the alpha channel and the set of color coordinates for each point in the image of the foreground object, as a function of said sets of color coordinates for the first and second composite images, and for the first and second background images.

32. The system of claim 24, wherein while triangulating the data stored in memory, a least squares technique is used to determine the value of the alpha channel and the set of color coordinates for each point in the image of the foreground object, as a function of:
(a) the sets of color coordinates for the first and second composite images; and (b) the sets of color coordinates for the first and second background images.

33. The system of claim 24, wherein while triangulating the data stored in memory, the processor:
(a) determines a lower limit of the alpha value for each point in the image of the foreground object as a function of the set of color coordinates for the point;
(b) determines an upper limit of the alpha value for each point in the image of the foreground object as a function of the set of color coordinates for the point; and
(c) employs said lower limit and said upper limit to define a range for the alpha value at each point in the image of the foreground object.

34. The system of claim 20, wherein while triangulating the data stored in memory, the processor:
(a) stores data in the memory, said data corresponding to the digitized signals that define a first scene of the foreground object disposed in front of a first portion of a background but not in front of a second portion of the background, said background having a coloring that changes between the first and second portions of the background, a section of said first scene that includes the foreground object disposed in front of the first portion of the background being employed by the processor to define the first composite image, and another section of said first scene that includes the second portion of the background being employed by the processor to define a second background image; and
(b) store data into the memory, said data corresponding to the digitized signals that define a second scene of the foreground object disposed in front of the second portion of the background but not in front of the first portion of the background, a section of said second scene that includes the foreground object disposed in front of the second portion of the background being employed to define the second composite image and another section of said second scene that includes the first portion of the background being employed to define a first background image; and
(c) determine a set of color coordinates for each point in the first background image and for each point in the second background image, the set of color coordinates that define the foreground object apart from any background being determined as a function of the set of color coordinates for each of the points in the first and the second background images and in the first and second composite images.

35. The system of claim 34, wherein the functions implemented by the processor further include storing data in the memory corresponding to the digitized signals that define the foreground object being rigidly moved relative to the background, when recording the first and the second scenes.

36. The system of claim 20, wherein the functions implemented by the processor further include:
(a) storing data in the memory, said data corresponding to the digitized signals that define a plurality of similarly recorded images of a scene for each composite image;
(b) storing data in the memory, said data corresponding to the digitized signals that define a plurality of sets of color coordinates for each point in said plurality of images;
(c) averaging said plurality of sets of color coordinates to produce the set of color coordinates for each point in each composite image.

37. The system of claim 20, wherein the functions implemented by the processor further include:

(a) recording n minus two additional composite images, each of said additional composite images including the foreground object disposed in front of a different background having an arbitrary coloring that is different than the arbitrary coloring of any other backgrounds;
(b) producing a set of color coordinates for each point in the additional composite images, said color coordinates defining a color for each point; and
(c) triangulating the set of color coordinates for each point in each of the first, the second, and the n minus two additional composite images, the step of triangulating returning the alpha value and the set of color coordinates for each point in the image of the foreground object.

38. An article of manufacture adapted for use with a computer, for extracting an image of a foreground object from at least two composite images, comprising:
(a) a memory medium adapted to be used with the computer; and
(b) a plurality of machine instructions stored on the memory medium, said machine instructions, when executed by a computer, causing the computer to implement a plurality of functions, including:
(i) storing data, said data corresponding to the digitized signals that define a composite image of the foreground object disposed in front of a first background having a first arbitrary coloring;
(ii) storing data, said data corresponding to the digitized signals that define a second composite image of the foreground object disposed in front of a second background having a second arbitrary coloring that is different than the first arbitrary coloring; and
(iii) using the data that was stored, triangulating the set of color coordinates for each point in each of the first and the second composite images, returning an alpha value and a set of color coordinates for each point in the image of the foreground object, to define the image of the foreground object apart from any background.

39. The article of manufacture of claim 38, wherein the functions further include aligning each point of the first composite image with a corresponding point disposed within the second composite image.

40. The article of manufacture of claim 38, wherein while triangulating the data stored, the machine instructions cause the computer to:
(a) store data corresponding to the digitized signals that define a first background image, including the first background, but not the foreground object;
(b) store data corresponding to the digitized signals that define a second background image, including the second background, but not the foreground object; and
(c) determining a set of color coordinates for each point in the first background image and for each point in the second background image, the set of color coordinates that define the foreground object apart from any background being determined as a function of the set of color coordinates for each of the points in the first and the second background images and in the first and second composite images.

41. The article of manufacture of claim 38, wherein, the set of color coordinates for each of the first and the second composite images indicate values for a red color, a green color, and a blue color, at each of the points in said images.

42. The article of manufacture of claim 38, wherein each point in the first background image has a color that is different than that of a corresponding point in the second background image, so that a sum of differences between the values for a red color, a green color and a blue color, respectively, for corresponding points in the first background and the second background, is not equal to zero.

43. The article of manufacture of claim 38, wherein each point in the first background image has a color that is different than that of a corresponding point in the second background image, so that a sum of squared differences between the values for a red color, a green color and a blue color, respectively, for corresponding points in the first background and the second background, is not equal to zero.

44. The article of manufacture of claim 38, wherein a constant illumination of the foreground object and the first and second background is employed during the recording of the first and the second composite images that are defined by the digitized signals.

45. The article of manufacture of claim 38, wherein substantially constant distances are maintained between the foreground object and a camera, and between the foreground object and the first and second backgrounds during the recording of the first and the second composite images that are defined by the digitized signals.

46. The article of manufacture of claim 38, wherein the first background is an arbitrary pure color and the second background is a different, but otherwise arbitrary pure color.

47. The article of manufacture of claim 40, wherein while triangulating the data, the machine instructions cause the computer to employ a difference of sums technique to determine the value of the alpha channel and the set of color coordinates for each point in the image of the foreground object, as a function of:
    (a) said sets of color coordinates for the first and second composite images; and
    (b) said sets of color coordinates for the first and second background images.

48. The article of manufacture of claim 40, wherein while triangulating the data, the machine instructions cause the computer to employ a least squares technique to determine the value of the alpha channel and the set of color coordinates for each point in the image of the foreground object, as a function of:
    (a) the sets of color coordinates for the first and second composite images; and
    (b) the sets of color coordinates for the first and second background images.

49. The article of manufacture of claim 38, wherein the functions further include:
    (a) determining a lower limit of the alpha value for each point in the image of the foreground object as a function of the set of color coordinates for the point;
    (b) determining an upper limit of the alpha value for each point in the image of the foreground object as a function of the set of color coordinates for the point; and
    (c) employing said lower limit and said upper limit to define a range for the alpha value at each point in the image of the foreground object.

50. The article of manufacture of claim 38, wherein while triangulating the data, the machine instructions cause the computer to:
    (a) enter data that define a first scene of the foreground object disposed in front of a first portion of a background, but not disposed in front of a second portion of the background, said first and second portions of the background having different coloring, a section of said first scene that includes the foreground object disposed in front of the first portion of the background being employed to define the first composite image, and another section of said first scene that includes the second portion of the background being employed to define a second background image; and
    (b) enter data that define a second scene of the foreground object disposed in front of the second portion of the background, but not in front of the first portion of the background, a section of said second scene that includes the foreground object disposed in front of the second portion of the background being employed to define the second composite image, and another section of said second scene that includes the first portion of the background being employed to define a first background image; and
    (c) determine a set of color coordinates for each point in the first background image and for each point in the second background image, the set of color coordinates that define the foreground object apart from any background being determined as a function of:
        (i) the set of color coordinates for each of the points in the first and the second background images; and
        (ii) the set of color coordinates for each of the point in the first and second composite images.

51. The article of manufacture of claim 38, wherein the functions further include entering data that define the foreground object being rigidly moved relative to the background, when recording the first and the second scenes.

52. The article of manufacture of claim 38, wherein the functions further include:
    (a) entering data that define a plurality of similarly recorded scenes for each composite image;
    (b) entering data that define a plurality of sets of color coordinates for each point of said plurality of scenes;
    (c) averaging said plurality of sets of color coordinates to produce the set of color coordinates for each point in each composite image.

53. The article of manufacture of claim 38, wherein the functions further include:
    (a) recording n minus two additional composite images, each of said additional composite images including the foreground object disposed in front of a different background having an arbitrary coloring that is different than the arbitrary coloring of any other backgrounds;
    (b) producing a set of color coordinates for each point in the additional composite images, said color coordinates defining a color for each point; and
    (c) triangulating the set of color coordinates for each point in each of the first, the second, and the n minus two additional composite images, returning the alpha value and the set of color coordinates for each point in the image of the foreground object.

* * * * *

UNITED STATES PATENT AND TRADEMARK OFFICE
CERTIFICATE OF CORRECTION

PATENT NO. : 6,301,382 B1  
DATED : October 9, 2001  
INVENTOR(S) : Smith et al.

Page 1 of 1

It is certified that error appears in the above-identified patent and that said Letters Patent is hereby corrected as shown below:

Column 7,  
Line 50, "$B_o = \dfrac{B_{j_2}B_{k_2} - B_{j_1}B_{k_2}}{B_{k_1} - B_{k_2}}$" should read -- $B_o = \dfrac{B_{j_2}B_{k_1} - B_{j_1}B_{k_2}}{B_{k_1} - B_{k_2}}$ --

Column 9,  
Line 64, delete "$[-R_{\Delta_1} \quad -G_{\Delta_1} \quad -B_{\Delta_1} \quad -R_{\Delta_2} \quad -G_{\Delta_2} \quad -B_{\Delta_2}]$."

Column 10,  
Line 14,  
"$\begin{bmatrix} R_{\Delta_1} + R_{\Delta_1} & G_{\Delta_1} + G_{\Delta_2} & B_{\Delta_1} + B_{\Delta_2} & \Gamma \end{bmatrix}$"

-- $\begin{bmatrix} R_{\Delta_1} + R_{\Delta_2} & G_{\Delta_1} + G_{\Delta_2} & B_{\Delta_1} + B_{\Delta_2} & \Gamma \end{bmatrix}$ --

Lines 20-27, delete "$\begin{bmatrix} R_{\Delta_1} + R_{\Delta_2} & G_{\Delta_1} + G_{\Delta_2} & B_{\Delta_1} + B_{\Delta_2} & \Gamma \end{bmatrix}$ where $\Lambda = R_{k_1}^2 + G_{k_1}^2 + B_{k_1}^2 + R_{k_2}^2 + G_{k_2}^2 + B_{k_2}^2$ and $\Gamma = -(R_{k_1}R_{\Delta_1} + G_{k_1}G_{\Delta_1} + B_{k_1}B_{\Delta_1} + R_{k_2}R_{\Delta_2} + G_{k_2}G_{\Delta_2} + B_{k_2}B_{\Delta_2})$ Column 12,  
Lines 23-24, "relationship (s)" should read -- relationship(s) --  
Lines 60-61, "4,100, 569 (Vlahos)" should read -- 4,100,569 (Vlahos) --

Signed and Sealed this

Twenty-first Day of May, 2002

Attest:

*Attesting Officer*

JAMES E. ROGAN  
*Director of the United States Patent and Trademark Office*